United States Patent
Kwon et al.

(10) Patent No.: US 12,473,558 B2
(45) Date of Patent: Nov. 18, 2025

(54) PROMOTER AND USE THEREOF

(71) Applicant: CJ CHEILJEDANG CORPORATION, Seoul (KR)

(72) Inventors: Nara Kwon, Seoul (KR); Sojung Park, Seoul (KR); Moo Young Jung, Seoul (KR); Kyungrim Kim, Seoul (KR); Heeyeong Kim, Seoul (KR); Jaemin Lee, Seoul (KR); Hyun Ah Kim, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 197 days.

(21) Appl. No.: 17/911,133

(22) PCT Filed: Nov. 12, 2021

(86) PCT No.: PCT/KR2021/016490
§ 371 (c)(1),
(2) Date: Sep. 13, 2022

(87) PCT Pub. No.: WO2022/244932
PCT Pub. Date: Nov. 24, 2022

(65) Prior Publication Data
US 2024/0200082 A1 Jun. 20, 2024

(30) Foreign Application Priority Data

May 20, 2021 (KR) .................. 10-2021-0064855

(51) Int. Cl.
| | | |
|---|---|---|
| C12N 1/20 | (2006.01) | |
| C12N 9/10 | (2006.01) | |
| C12N 15/09 | (2006.01) | |
| C12N 15/52 | (2006.01) | |
| C12N 15/77 | (2006.01) | |
| C12P 13/04 | (2006.01) | |
| C12R 1/15 | (2006.01) | |

(52) U.S. Cl.
CPC ........... *C12N 15/52* (2013.01); *C12N 9/1022* (2013.01); *C12N 15/77* (2013.01); *C12P 13/04* (2013.01); *C12R 2001/15* (2021.05); *C12Y 202/01001* (2013.01)

(58) Field of Classification Search
CPC ...... C12N 15/52; C12N 15/09; C12N 9/1022; C12N 1/20; C12R 2001/15; C12Y 202/01001; C12P 13/04
See application file for complete search history.

(56) References Cited

U.S. PATENT DOCUMENTS

| | | | |
|---|---|---|---|
| 9,556,463 B2 | 1/2017 | Ha et al. | |
| 2013/0004999 A1 | 1/2013 | Reth et al. | |

FOREIGN PATENT DOCUMENTS

| | | |
|---|---|---|
| EP | 4 116 317 A1 | 1/2023 |
| KR | 10-0792095 B1 | 1/2008 |
| KR | 10-0924065 B1 | 10/2009 |
| KR | 10-1783170 B1 | 9/2017 |
| KR | 10-1947959 B1 | 2/2019 |
| KR | 10-2011994 B1 | 8/2019 |
| KR | 10-2019-0106815 A | 9/2019 |
| KR | 10-1996769 B1 | 10/2019 |
| KR | 10-2134418 B1 | 7/2020 |
| KR | 10-2020-0136813 A | 12/2020 |
| WO | WO 2008-013432 A1 | 1/2008 |
| WO | WO 2014/208970 A1 | 12/2014 |
| WO | WO 2022/244932 A1 | 11/2022 |

OTHER PUBLICATIONS

Canadian Office Action No. 3,171,537 dated Oct. 16, 2023; 4 pages.
The Extended European search report of EP Application No. 21918134.4 dated Jun. 4, 2024; 8 pages.
Ikeda et al., "Cloning of the transketolase gene and the effect of its dosage on aromatic amino acid production in *Corynebacterium glutamicum*", Applied Microbiology and Biotechnology, Springer Berlin Heidelberg, Berlin/Heidelberg, vol. 51, Jan. 1, 1999, pp. 201-206, XP000960910, ISSN: 0175-7598, DOI: 10.1007/S002530051382.
Office Action of Eurasian Patent application No. 2022120330 dated Mar. 28, 2023, including English comments.
Dolferus et al., "Differential Interactions of Promoter Elements in Stress Responses of the *Arabidopsis* Adh Gene", Plant Physiol., 1994, vol. 105, No. 4, pp. 1075-1087.
Donald and Cashmore, "Mutation of either G boxorl boxsequences profoundly affects expression from the *Arabidopsis* rbcS-1A promoter", The EMBO Journal, 1990, vol. 9, No. 6, pp. 1717-1726.
Interanational Search report and written opinion of PCT/KR2021/016490 mailed Mar. 7, 2022; 8 pages.
GenBank Accession No. WP_060564335.1, "aromatic amino acid transport protein AroP [Corynebacterium glutamicum]", Aug. 31, 2020; 1 page.
Gibson et al., "Enzymatic assembly of DNA molecules up to several hundred kilobases", Nature Methods, vol. 6, No. 5, May 2009, pp. 343-345; DOI: 10.1038/nmeth.1318.
Gory et al., "Use of green fluorescent protein to monitor Lactobacillus sakei in fermented meat products", FEMS Microbiology Letters, 194, 2001, pp. 127-133.
Ishida et al., "Improvement of an L-Threonine Producer Derived from *Brevibacterium flavum* Using Threonine Operon of *Escherichia coli* K-12", Agric. Biol. Chem. 53 (8) pp. 2269-2271, 1989.
Kalinowski et al., "The complete *Corynebacterium glutamicum* ATCC 13032 genome sequence and its impact on the production of L-aspartate-derived amino acids and vitamins", Journal of Biotechnology, 2003, 140, pp. 5-25.

(Continued)

*Primary Examiner* — Maryam Monshipouri
(74) *Attorney, Agent, or Firm* — Squire Patton Boggs (US) LLP

(57) ABSTRACT

The present application relates to a novel promoter and a method for producing target materials using the same. More specifically, the present application relates to a novel polynucleotide having promoter activity, a gene expression cassette, and a host cell comprising the same, and a method for producing target materials using the microorganism.

17 Claims, No Drawings

Specification includes a Sequence Listing.

(56) References Cited

OTHER PUBLICATIONS

Kikuchi et al., "Mutational Analysis of the Feedback Sites of Phenylalanine-Sensitive 3-Deoxy-D-arabino-Heptulosonate-7-Phosphate Synthase of *Escherichia coli*", Applied and Environmental Microbiology, Feb. 1997, vol. 63, No. 2, pp. 761-762.

Li et al., "Obtaining a series of native gradient promoter-5'-UTR sequence in Corynebacterium glutamicum ATCC 13032", Microbial Cell Factories, 2020, 19, 120; https://doi.org/10.1186/s12934-020-01376-3.

Lütke-Eversloh et al., "$_L$-Tyrosine production by deregulated strains of *Escherichia coli*", Appl. Microbiol. Biotechnol., vol. 75, 2007, pp. 103-110; DOI 10.1007/s00253-006-0792-9.

M. E. van der Rest et al., "A heat shock following electroporation induces highly effcient transformation of *Corynebacterium glutamicum* with xenogeneic plasmid DNA", Appl. Microbiol. Biotechnol., (1999) 52:541-545.

Matsui et al., "Two Single-Base-Pair Substitutions Causing Desensitizationto Tryptophan Feedback Inhibition of Anthranilate Synthase and Enhanced Expression of Tryptophan Genes of Brevibacterium lactofermentum", Journal of Bacteriology, vol. 169, No. 11, Nov. 1987, pp. 5330-5332.

Morbach et al., "$_L$-Isoleucine Production with Corynebacterium glutamicum: Further Flux Increase and Limitation of Export", Applied and Environmental Microbiology, vol. 62, No. 12, Dec. 1996, pp. 4345-4351.

NCBI Reference Sequence: NC_003450.3, "Corynebacterium glutamicum ATCC 13032, complete sequence", Dec. 14, 2021.

NCBI, Genbank accession No. CP025533.1, "Corynebacterium glutamicum strain ATCC 13032 chromosome, complete genome", Biotechnology, The catholic university of Korea, Dec. 27, 2017.

Park et al., "Construction of Heat-Inducible Expression Vector of Corynebacterium glutamicum and C. ammoniagenes: Fusion of X Operator with Promoters Isolated from C. ammoniagenes", J.Microbiol. Biotechnol. 2008, 18 (4), pp. 639-647.

PROMOTER AND USE THEREOF

CROSS-REFERENCE TO RELATED APPLICATIONS

The present application is a 35 U.S.C. § 371 national-phase filing of International Application No. PCT/KR2021/016490, filed on Nov. 12, 2021, which claims the benefit of Korean Patent Application No. 10-2021-0064855, filed on May 20, 2021, both of which applications are incorporated herein by reference in their entirety.

INCORPORATION BY REFERENCE

This application contains a sequence listing entitled "059520_00033_ST25.txt," being submitted herein in ASCII format via EFS-Web, which is a copy of the sequence listing as filed in PCT/KR2021/016490, which was modified on Aug. 4, 2022 and is 16,829 bytes in size.

TECHNICAL FIELD

The present application relates to a novel promoter and a method for producing target materials using the same. More specifically, the present application relates to a novel polynucleotide having promoter activity, a vector and a host cell including the same, and a method for producing target materials using the microorganism.

BACKGROUND ART

The process of producing target materials (e.g., amino acids) from microorganisms has been studied in various ways as an eco-friendly and safe production method. Among these, research has been continuously conducted to produce a large amount of target materials in microorganisms of the genus *Corynebacterium*. Microorganisms of the genus *Corynebacterium*, particularly *Corynebacterium glutamicum*, are gram-positive microorganisms that are widely used to produce L-amino acids and other useful materials. In order to produce the L-amino acids and other useful materials, various studies are being conducted to develop microorganisms with high-efficiency production and technologies for fermentation processes.

L-Lysine, a representative material produced by the microorganisms of the genus *Corynebacterium*, is used in animal feeds, pharmaceuticals for human use, and the cosmetics industry, and is produced by fermentation using strains of *Corynebacterium*. A microorganism in which the L-lysine biosynthesis-related genes are enhanced and a method for producing L-lysine using the same, etc., are known in the art (KR 10-0924065 B1).

Additionally, L-threonine is an essential amino acid and is widely used in feed and food additives, and is also used in infusions for medicine and as raw materials for pharmaceuticals. Since L-threonine is low in vegetable protein, it is effectively used as an additive for animal feed. L-Threonine is mainly produced by fermentation using *E. coli* or microorganisms of the genus *Corynebacterium* developed using artificial mutation or genetic recombination. Typically, a method using a gene recombinant strain to produce L-threonine by introducing an *E. coli*-derived threonine operon into *Brevibacterium flavum*, a threonine-producing strain, etc., is known in the art (TURBA E, et al., *Agric. Biol. Chem.* 53:2269-2271, 1989).

O-Acetyl homoserine is a substance used as a precursor of methionine production and is an intermediate in the methionine biosynthesis pathway (WO 2008/013432). O-Acetyl-L-homoserine is synthesized from L-homoserine and acetyl-CoA as substrates by way of homoserine O-acetyl transferase.

L-Isoleucine shares a major biosynthetic pathway with other branched-chain amino acids, L-valine and L-leucine. In regard to the biosynthetic pathway of L-isoleucine, 2-ketobutyrate produced from L-threonine, an amino acid derived from pyruvate and aspartic acid which are produced in glycolysis, is used as a precursor. From the two precursors, 2-aceto-2-hydroxyacetate is synthesized through the action of an enzyme acetohydroxyacid synthase (AHAS), and then 2,3-dihydroxy-3-methylvalerate is produced by way of acetohydroxyacid isomeroreductase. Subsequently, 2-keto-3-methylvalerate is produced by the action of dihydroxyacid dehydratase, and L-isoleucine is ultimately produced through the aminotransferase reaction. In addition, the acetohydroxyacid synthase catalyzes decarboxylation of pyruvate and a condensation reaction with other pyruvate molecules to produce acetolactate, a precursor of valine and leucine.

L-Tryptophan, one of the essential amino acids, has been widely used in feed additives, or as a raw material for pharmaceuticals such as infusions, and as a material for health food. Currently, L-tryptophan is mainly produced by direct fermentation using microorganisms.

L-Tyrosine is an amino acid and is used as an important material for pharmaceutical raw materials, food additives, animal feed, nutritional supplements, etc. In order to produce the L-tyrosine and other useful materials, various studies are being conducted to develop microorganisms with high-efficiency production and technologies for fermentation processes. The production process of L-tyrosine by microorganisms starts with 3-deoxy-D-arobino-heptulosonate-7-phosphate (DAHP) produced by the polymerization reaction of phosphoenolpyruvate (PEP), which is an intermediate of glycolysis, with erythrose-4-phosphate (E4P), which is an intermediate of the pentose phosphate pathway. Then, DAHP is biosynthesized from chorismate to prephenate through the common aromatic biosynthetic pathway and is ultimately converted to L-tyrosine through the L-tyrosine biosynthetic pathway. During this process, chorismate can be shunted into L-tryptophan, and prephenate can be shunted into L-tyrosine or L-phenylalanine. Thus, when the common aromatic biosynthetic pathway is strengthened so as to increase the amount of L-tyrosine produced, it can be expected that the production of L-tryptophan and L-phenylalanine will also increase at the same time. That is, in order to produce L-tyrosine, phenylalanine and tryptophan are produced together as by-products, and accordingly, various studies such as gene recombination, purification, etc. must be carried out. Meanwhile, it is known that the production of L-tryptophan is regulated by repressors and attenuators according to the concentration of L-tryptophan produced by microorganisms (Korean Patent No. 10-0792095).

L-Phenylalanine is the starting material for L-aspartyl-L-phenylalanine methyl ester, which is a sweetener.

If a universal promoter that is not limited to specific useful materials is developed, it is expected that it can be utilized in the production of various useful materials.

Under such circumstances, the present inventors have developed a polynucleotide having novel promoter activity capable of producing target materials with high productivity in microorganisms of the genus *Corynebacterium*, and have confirmed that the productivity of the target materials can be increased by introducing the polynucleotide into the microorganisms, thereby completing the present application.

DISCLOSURE

Technical Problem

The present inventors have made extensive efforts to prepare a novel polynucleotide having promoter activity, and as a result, they have confirmed that the target gene promoter can be enhanced by nucleotide substitution, and the enhanced promoter can regulate the expression of genes operably linked to the promoter, thereby completing the present application.

Technical Solution

One object of the present application is to provide a polynucleotide having promoter activity, in which the nucleotides at positions 218, 219, 220, 221, 222, 225, and 227 in the polynucleotide sequence of SEQ ID NO: 1 are substituted with other nucleotides.

Another object of the present application is to provide a gene expression cassette, including: the polynucleotide; and a gene encoding a target protein which is operably linked to the polynucleotide.

Still another object of the present application is to provide a host cell, including: the polynucleotide; and a gene encoding a target protein which is operably linked to the polynucleotide.

Yet another object of the present application is to provide a method for producing a target material, including: culturing the host cell in a medium; and recovering the target material from the medium.

Even another object of the present application is to provide the use of a polynucleotide, in which the nucleotides at positions 218, 219, 220, 221, 222, 225, and 227 in the polynucleotide sequence of SEQ ID NO: 1 are substituted with other nucleotides, as a promoter.

Advantageous Effects

The novel promoter of the present application may be introduced into a microorganism for producing target materials to increase the production of target materials of the microorganism. Due to the improved production yield, effects such as production cost reduction along with the convenience of production may be expected in the industrial aspect.

DETAILED DESCRIPTION OF PREFERRED EMBODIMENTS

The present application will be described in detail as follows. Meanwhile, each description and embodiment disclosed herein can be applied to other descriptions and embodiments, respectively. That is, all combinations of various elements disclosed herein fall within the scope of the present application. Further, the scope of the present application is not limited by the specific description described below.

Additionally, those of ordinary skill in the art may be able to recognize or confirm, using only conventional experimentation, many equivalents to the particular aspects of the invention described herein. Furthermore, it is also intended that these equivalents be included in the present application.

One aspect of the present application provides a polynucleotide having promoter activity.

Specifically, the polynucleotide having promoter activity of the present application may be a polynucleotide having promoter activity, including at least one nucleotide substitution in the polynucleotide sequence of SEQ ID NO: 1.

As used herein, the term "polynucleotide" is a DNA strand having more than a certain length as a nucleotide polymer, which is a long chain of nucleotide monomers connected by covalent bonds.

As used herein, the term "promoter" refers to an untranslated nucleotide sequence located upstream of a coding region, which includes a binding site for a polymerase and has the activity of initiating transcription of a promoter-target gene into mRNA, i.e., a DNA region that leads to the initiation of transcription of a particular gene when a polymerase binds thereto. The promoter may be located at the 5' region of an mRNA transcription initiation site.

As used herein, the term "polynucleotide having promoter activity" refers to a DNA region present in the vicinity of a region, which is involved in the transcription of a target gene including a binding site of an RNA polymerase or an enhancer, for the expression of a gene to be operably connected downstream thereof, i.e., the target gene. For the purpose of the present application, the polynucleotide may be used as a promoter for general use. Additionally, the polynucleotide may regulate (e.g., increase or decrease), in a cell, as compared to an existing promoter or a cell-internal promoter, the expression of a target gene operably linked thereto and the production and/or activity of a protein encoded by the target gene, and may regulate (e.g., increase or decrease) the production and/or activity of target products (as biologically active material, for example, at least one selected from the group consisting of amino acids, nucleic acids, vitamins, proteins, fatty acids and organic acids, etc.) involved in the production of proteins, but is not limited thereto.

For example, the polynucleotide having promoter activity of the present application may be used as a promoter capable of enhancing the expression of a polypeptide having transketolase (tkt) activity. Additionally, the polynucleotide may be a polynucleotide involved in increasing the production or production amount of lysine, threonine, O-acetyl homoserine, isoleucine, tryptophan, tyrosine or phenylalanine.

The polynucleotide of the present application may include any polynucleotide sequences having promoter activity without limitation.

In one example, the polynucleotide having promoter activity of the present application may include a polynucleotide having promoter activity, in which at least one nucleotide in the nucleotide sequence of SEQ ID NO: 1 is substituted with another nucleotide. Specifically, in the present application, the polynucleotide having promoter activity may be a polynucleotide having promoter activity, including one or more, two or more, three or more, four or more, five or more, six or more or seven or more nucleotide substitutions in the polynucleotide sequence of SEQ ID NO: 1. In the present application, the polynucleotide having promoter activity may be used interchangeably with "modified promoter", and all of the above-described terms may be used herein.

In the present application, the polynucleotide sequence of SEQ ID NO: 1 may be, for example, a polynucleotide having promoter activity of transketolase. Additionally, a polynucleotide in which specific nucleotides are substituted in the polynucleotide sequence of SEQ ID NO: 1 may also be a polynucleotide having promoter activity of transketolase, as long as it has promoter activity. The polynucleotide sequence of SEQ ID NO: 1 may be a representative polynucleotide for indicating a mutation position, and other polynucleotide sequences having promoter activity, which correspond thereto, are also included in the sequence that can introduce a mutation. For example, any polynucleotide sequences capable of serving as a promoter for transketolase (tkt) or a polypeptide having a corresponding activity may be included in the range of sequences that can introduce a mutation of the present application, without limitation.

The nucleotide sequence of SEQ ID NO: 1 can be confirmed from NCBI GenBank, a known database, and the sequence corresponding to SEQ ID NO: 1, as a sequence that can serve as a promoter for transketolase, may be derived from *Corynebacterium* sp., and specifically, it may be a sequence of *Corynebacterium glutamicum*, but a sequence having an activity equal to or higher than that of the polynucleotide may be included in the promoter of the present application, without limitation.

The polynucleotide having promoter activity of the present application may be one in which the promoter activity is enhanced by substitution of nucleotides at specific positions in the polynucleotide sequence having existing promoter activity.

In one embodiment, the polynucleotide having promoter activity of the present application may include a polynucleotide having promoter activity in which at least one nucleotide in the nucleotide sequence of SEQ ID NO: 1 is substituted with another nucleotide. Specifically, it may be composed of a polynucleotide having promoter activity, in which at least one nucleotide in the nucleotide sequence of SEQ ID NO: 1 is substituted with another nucleotide. In the present application, the polynucleotide having promoter activity may be used interchangeably with "modified promoter".

In one embodiment, the modified promoter may be a polynucleotide having promoter activity, including substitutions of at least one nucleotide selected from the group consisting of nucleotides at positions 218, 219, 220, 221, 222, 225, and 227 with other nucleotides. Specifically, the modified promoter may be one in which any one or more, two or more, three or more, four or more, five or more, six or more or seven of the above positions or their corresponding positions are substituted with other nucleotides.

As used herein, the term "another/other nucleotide" is not limited as long as it is different from the nucleotide before substitution. For example, when it is described that "the nucleotide at position 218 in SEQ ID NO: 1 is substituted with another nucleotide", it means that it is substituted with adenine (A), thymine (T), or guanine (G), except for cytosine (C). In addition, unless otherwise indicated, when it is described that a specific nucleotide is "substituted", it means that the nucleotide is substituted with another nucleotide which is different from the nucleotide before substitution.

Meanwhile, those skilled in the art can identify a nucleotide at a position corresponding to the nucleotides at positions 218, 219, 220, 221, 222, 225, and 227 of SEQ ID NO: 1 of the present application in any polynucleotide sequences through sequence alignment known in the art. Further, unless otherwise indicated herein, when it is described that "a nucleotide at a specific position in a specific SEQ ID NO, it is obvious that it is meant to include the "nucleotides at the corresponding position" in any polynucleotide sequences. Therefore, the polynucleotide sequences in which any one or more nucleotides selected from the group consisting of nucleotides at positions corresponding to 218, 219, 220, 221, 222, 225, and 227 of SEQ ID NO: 1 in any polynucleotide sequence having promoter activity is substituted with other nucleotides also fall within the scope of the present application.

In one example, when one or more, two or more, three or more, four or more, five or more, six or more or seven nucleotides at positions corresponding to 218, 219, 220, 221, 222, 225, and 227 in the polynucleotide sequence of SEQ ID NO: 1 is substituted with other nucleotides, promoters with higher activity than unsubstituted (unmodified) promoter sequences can be obtained.

Specifically, the polynucleotide having promoter activity of the present application may be one in which the nucleotides at positions 218, 219, 220, 221, 222, 225, and 227 in the polynucleotide sequence of SEQ ID NO: 1 are substituted with other nucleotides, but is not limited thereto.

In a specific example, the polynucleotide having promoter activity of the present application may be a polynucleotide in which cytosine (C), the nucleotide at position 218, is substituted with thymine (T), cytosine (C), the nucleotide at position 219, is substituted with guanine (G), adenine (A), the nucleotide at position 220, is substituted with thymine (T), adenine (A), the nucleotide at position 221, is substituted with guanine (G), thymine (T), the nucleotide at position 222, is substituted with guanine (G), adenine (A), the nucleotide at position 225, is substituted with thymine (T), and cytosine (C), the nucleotide at position 227, is substituted with adenine (A), in the polynucleotide sequence of SEQ ID NO: 1.

In a more specific example, it may be a polynucleotide composed of a nucleotide sequence of SEQ ID NO: 2. Specifically, the polynucleotide having promoter activity in the present application may be a polynucleotide including or consisting (essentially of) the polynucleotide sequence of SEQ ID NO: 2.

In addition, various modifications to the polynucleotide sequence may be included in a range that does not significantly reduce promoter activity, without limitation to the above-described embodiments. For example, the nucleotide sequence of the present application may be modified by conventionally-known mutagenesis, e.g., direct evolution, site-directed mutagenesis, etc.

In particular, the term "modification" refers to a phenotypic change that is genetically or non-genetically stable, and may be interchangeably referred to by the term "modification" or "mutation" herein.

Therefore, the polynucleotide having promoter activity in the present application may be a polynucleotide sequence having SEQ ID NO: 1 or SEQ ID NO: 2, or a polynucleotide sequence having at least 70%, 80%, 85%, 90%, 95%, 96%, 97%, 98%, or 99% homology or identity with SEQ I NO: 1 or SEQ ID NO: 2. The nucleotide sequence having homology or identity may be a sequence in the above range, excluding a sequence having 100% identity, or may be a sequence having less than 100% identity.

Meanwhile, in the present application, although it is described as "a polynucleotide having a nucleotide sequence of a particular SEQ ID NO" or "a polynucleotide including a nucleotide sequence of a particular SEQ ID NO", it is apparent that any polynucleotide, in which part of the nucleotide sequence is deleted, modified, substituted, or added, may also be used in the present application as long as the polynucleotide has the same or corresponding activity to the polynucleotide composed of the nucleotide sequence of the corresponding SEQ ID NO.

For example, as long as a polynucleotide has activity identical or corresponding to that of the polynucleotide, it is apparent that a polynucleotide in which a meaningless sequence is added within or at the terminal of the nucleotide sequence of the corresponding SEQ ID NO or a part of the sequence is deleted within or at the terminal of the nucleotide sequence of the corresponding SEQ ID NO also falls within the scope of the present application.

As used herein, the term "homology" or "identity" refers to a degree of relatedness between two given nucleotide sequences, and may be expressed as a percentage.

The terms homology and identity may often be used interchangeably with each other.

The sequence homology or identity of the conserved polynucleotide may be determined by standard alignment algorithms, and may be used with default gap penalties established by the program being used. Substantially, homologous or identical sequences may hybridize under moderately or highly stringent conditions such that the full length of the sequence or at least about 50%, 60%, 70%, 80%, or 90% or more of the full-length may hybridize. Polynucleotides that contain degenerate codons instead of codons in hybridizing polynucleotides are also considered.

Whether any two polynucleotide sequences have a homology, similarity, or identity may be, for example, determined by a known computer algorithm such as the "FASTA" program (Pearson et al., (1988) *Proc. Natl. Acad. Sci. USA* 85:2444) using default parameters. Alternatively, it may be determined by the Needleman-Wunsch algorithm (Needleman and Wunsch, 1970, *J. Mol. Biol.* 48:443-453), which is performed using the Needleman program of the EMBOSS package (EMBOSS: The European Molecular Biology Open Software Suite, Rice et al., 2000, *Trends Genet.* 16:276-277) (preferably, version 5.0.0 or later) (GCG program package (Devereux, J. et al., *Nucleic Acids Research* 12:387 (1984)), BLASTP, BLASTN, FASTA (Atschul, S. F. et al., *J MOLEC BIOL* 215:403 (1990); *Guide to Huge Computers*, Martin J. Bishop, ed., Academic Press, San Diego, 1994, and CARILLO et al. (1988) *SIAM J Applied Math* 48:1073). For example, the homology, similarity, or identity may be determined using BLAST or ClustalW of the National Center for Biotechnology Information (NCBI).

The homology, similarity, or identity of polynucleotides may be, for example, determined by comparing sequence information using, for example, the GAP computer program, such as Needleman et al. (1970), *J Mol Biol.* 48:443 as disclosed in Smith and Waterman, *Adv. Appl. Math* (1981) 2:482. In summary, the GAP program defines the homology, similarity, or identity as the value obtained by dividing the number of similarly aligned symbols (i.e., nucleotides or amino acids) by the total number of the symbols in the shorter of the two sequences. Default parameters for the GAP program may include (1) a unary comparison matrix (containing a value of 1 for identities and 0 for non-identities) and the weighted comparison matrix of Gribskov et al. (1986), *Nucl. Acids Res.* 14:6745, as disclosed in Schwartz and Dayhoff, eds., *Atlas of Protein Sequence and Structure*, National Biomedical Research Foundation, pp. 353-358 (1979) (or EDNAFULL substitution matrix (EMBOSS version of NCBI NUC4.4)); (2) a penalty of 3.0 for each gap and an additional 0.10 penalty for each symbol in each gap (or a gap opening penalty of 10 and a gap extension penalty of 0.5); and (3) no penalty for end gaps. Therefore, as used herein, the term "homology" or "identity" represents relatedness between sequences.

Additionally, a probe that may be prepared from a known gene sequence, for example, any polynucleotide sequence which can hybridize with a sequence complementary to all or part of the polynucleotide sequence under stringent conditions and shows identical activity may be included without limitation. The "stringent conditions" refers to conditions under which specific hybridization between polynucleotides is allowed. Such conditions are specifically described in the literature (e.g., J. Sambrook et al., *Molecular Cloning, A Laboratory Manual*, 2nd Edition, Cold Spring Harbor Laboratory press, Cold Spring Harbor, New York, 1989; F. M. Ausubel et al., *Current Protocols in Molecular Biology*, John Wiley & Sons, Inc., New York). For example, the stringent conditions may include conditions under which genes having a high homology or identity of 40% or higher, specifically 70% or higher, 80% or more, 85% or higher, 90% or higher, more specifically 95% or higher, much more specifically 97% or higher, and still much more specifically 99% or higher are hybridized with each other and genes having a homology or identity lower than the above homologies or identities are not hybridized with each other, or washing conditions of Southern hybridization, that is, washing once, specifically twice or three times at a salt concentration and a temperature corresponding to 60° C., 1×SSC, 0.1% SDS, specifically 60° C., 0.1×SSC, 0.1% SDS, and more specifically 68° C., 0.1×SSC, 0.1% SDS.

Hybridization requires that two nucleic acids contain complementary sequences, although mismatches between bases are possible depending on the stringency of the hybridization. The term "complementary" is used to describe the relationship between nucleotide bases that can hybridize with each other. For example, with respect to DNA, adenine is complementary to thymine, and cytosine is complementary to guanine. Therefore, the present application may include isolated nucleotide fragments complementary to the entire sequence as well as nucleic acid sequences substantially similar thereto.

Specifically, the polynucleotides having a homology or identity may be detected using the hybridization conditions including a hybridization step at a $T_m$ value of 55° C. under the above-described conditions. Further, the $T_m$ value may be 60° C., 63° C., or 65° C., but is not limited thereto, and may be appropriately adjusted by those skilled in the art depending on the purpose thereof.

The appropriate stringency for hybridizing polynucleotides depends on the length of the polynucleotides and the degree of complementation, and these variables are well known in the art (see Sambrook et al., supra, 9.50-9.51, 11.7-11.8).

The polynucleotide having promoter activity of the present application may be isolated or prepared using standard molecular biology techniques. For example, it may be prepared using standard synthesis techniques using an automated DNA synthesizer, but is not limited thereto.

The polynucleotide having promoter activity of the present application may be used as a promoter.

The promoter may be located at the 5' region of the transcription initiation site into mRNA.

The promoter may have increased or decreased promoter activity compared to a conventional promoter. That is, the promoter can increase or decrease the expression and/or activity of the protein encoded by the target gene as well as the expression of the target gene in a host cell. For the purposes of the present application, the target gene for expression enhancement or attenuation may be changed depending on the product to be produced, and the promoter may be used as a universal promoter for enhancement or attenuation of the target gene.

Another aspect of the present application provides a gene expression cassette including the polynucleotide and a target gene.

The polynucleotide of the present application is as described above.

As used herein, the term "gene expression cassette" refers to a unit cassette which includes a promoter and a target gene and thus can express the target gene operably linked to the downstream of the promoter. Such a gene expression cassette may include various factors that can assist efficient expression of the target gene, inside or outside of the cassette. The gene expression cassette may conventionally include a transcription termination signal, a ribosome-binding domain, and a translation termination signal, in addition to the promoter operably linked to the target gene, but is not limited thereto.

As used herein, the term "target gene" refers to a gene whose expression is to be controlled by the promoter sequence of the present application for the purpose of the present application. A protein encoded by the target gene may be expressed as a "target protein", and a gene encoding the "target protein" may be expressed as a "target gene".

Additionally, the polynucleotide encoding the target protein may undergo various modifications in the coding region within the scope that does not change the polypeptide sequence, due to codon degeneracy or in consideration of the codons preferred in an organism in which the polynucleotide of the present application is to be expressed. The polynucleotide sequence is as described above.

In one embodiment, the target protein may be a polypeptide having transketolase (tkt) activity. That is, the target gene of the promoter may be a gene encoding the polypeptide having transketolase (tkt) activity.

As used herein, the term "transketolase" is an enzyme that affects the pentose phosphate pathway, and produces D-sedoheptulose-7-phosphate and D-glyceraldehyde-3-phosphate from D-xylulose-5-phosphate and D-ribose-5-phosphate, and an effect of enhancing the productivity of useful materials, such as lysine, threonine, 0-acetyl homoserine, isoleucine, tryptophan, tyrosine, and phenylalanine can be obtained by the regulation of the activity thereof.

Examples of genes encoding transketolase may include the tkt gene (NCgl1512) of *Corynebacterium glutamicum* ATCC13032, etc., but are not limited thereto. Those skilled in the art can easily obtain the information of the gene encoding transketolase from GenBank, a known database, etc.

Additionally, the amino acid sequence constituting the transketolase can be obtained from GenBank of NCBI, a known database. For example, it may be derived from *Corynebacterium glutamicum*.

In addition, the "polypeptide having transketolase activity" of the present application includes not only the wild-type, unmodified or natural form of the transketolase, but also a mutant having the same activity or enhanced activity.

As used herein, the "modified polypeptide" has the same meaning as the "variant" and refers to a protein having one or more amino acids different from the recited sequence by conservative substitutions and/or modifications such that the functions and properties of the protein are retained.

The variants are different from the sequences identified by substitution, deletion or addition of several amino acids. Such variants may generally be identified by modifying one or more of the above amino acid sequences of the protein and evaluating the properties of the modified protein. That is, the ability of the variants may be enhanced relative to a native protein. Further, some variants may include those in which one or more portions, such as an N-terminal leader sequence or transmembrane domain, have been removed.

The term "variant" may be used interchangeably with terms such as modification, modified protein, modified polypeptide, mutant, mutein, divergent, variant, etc. without limitation, as long as the terms are used to indicate variation. For the purpose of the present application, the variant may be those in which the activity of the modified protein is enhanced compared to that of a native wild-type or non-modified protein, but is not limited thereto.

As used herein, the term "conservative substitution" refers to substitution of an amino acid with another amino acid having similar structural and/or chemical properties. The variant may have, for example, at least one conservative substitutions, while retaining at least one biological activity. Such amino acid substitution may generally occur based on similarity of polarity, charge, solubility, hydrophobicity, hydrophilicity, and/or amphipathic nature of a residue.

Additionally, the variant may also include deletion or addition of amino acids that have minimal influence on the properties and secondary structure of a polypeptide. For example, the polypeptide may be conjugated with a signal (or leader) sequence at the N-terminus involved in the transfer of proteins co-translationally or post-translationally. Further, the polypeptide may also be conjugated with another sequence or linker to identify, purify, or synthesize the polypeptide.

The gene encoding the polypeptide having the transketolase activity of the present application may be referred to as "tkt gene".

The gene may be derived from the microorganism of the genus *Corynebacterium*, and specifically *Corynebacterium glutamicum*.

In the present application, the polynucleotide encoding the polypeptide having the "tkt gene", i.e., the transketolase activity, may undergo various modifications in the coding region within the scope that does not change the polypeptide sequence, due to codon degeneracy or in consideration of the codons preferred in an organism in which the polypeptide is to be expressed.

The polypeptide having the transketolase activity of the present application may include variant sequences, and may specifically include variants of a modified protein such that the enhanced activity of transketolase may be expressed.

Still another aspect of the present application provides a recombinant vector, including the polynucleotide, or a gene expression cassette including the gene encoding the target protein operably linked to the polynucleotide.

The polynucleotide, target protein, and gene expression cassette of the present application are as described above.

In one embodiment, the target protein may be a polypeptide having the transketolase activity.

As used herein, the term "vector" is an artificial DNA molecule that possesses a genetic material to enable the expression of a target gene in an appropriate host cell, and specifically refers to a DNA construct which includes the nucleotide sequence of a gene encoding a target protein operably linked thereto.

As used herein, the term "operably linked" means that the polynucleotide having the promoter activity of the present application and the gene sequence are functionally linked so that the transcription of the target gene can be initiated and mediated. The operable linkage may be prepared using a genetic recombinant technology well-known in the art, and site-specific DNA cleavage and linkage may be prepared using cleavage and linking enzymes, etc., known in the art, but is not limited thereto.

For the purpose of the present application, the regulatory sequence may include the polynucleotide having the promoter activity of the present application.

Meanwhile, the regulatory sequence may include a promoter capable of initiating transcription, any operator sequence for the regulation of such transcription, a sequence encoding an appropriate mRNA ribosome-binding domain, and a sequence for the regulation of transcription and translation. Once transformed into a suitable host cell, the vector may replicate or function independently from the host genome, or may integrate into genome thereof.

The vector used in the present application may not be particularly limited as long as the vector is expressible in a host cell, and the host cell may be transformed using any vector known in the art. Examples of the conventionally-used vector may include natural or recombinant plasmids, cosmids, viruses, and bacteriophages.

For example, as a phage vector or cosmid vector, pWE15, M13, MBL3, MBL4, IXII, ASHII, APII, t10, t11, Charon4A, Charon21A, etc. may be used; and as a plasmid vector, those based on pDZ, pBR, pUC, pBluescriptII, pGEM, pTZ, pCL, pET, etc. may be used, but the vector is not limited thereto. Specifically, pDZ, pDC, pDCM2, pACYC177, pACYC184, pCL, pECCG117, pUC19, pBR322, pMW118, pCC1 BAC vectors, etc. may be used, but the vector is not limited thereto. The insertion of the polynucleotide into chromosome may be carried out by a method well-known in the art, e.g., homologous recombination.

Since the vector of the present application can be inserted into the chromosome via homologous recombination, a selection marker for confirming the insertion into the chromosome may further be included. The selection marker is used for the selection of a transformed cell, i.e., for confirming the insertion of the polynucleotide, and markers capable of providing selectable phenotypes such as drug resistance, nutrient requirement, resistance to cytotoxic agents, or expression of surface proteins may be used. Under the circumstances where selective agents are treated, only the cells capable of expressing the selection markers can survive or express other phenotypic traits, and thus the transformed cells can be selected.

As used herein, the term "transformation" refers to a process for introducing a vector including a polynucleotide encoding a target protein into a host cell, thereby enabling the expression of the protein encoded by the polynucleotide in the host cell. For the transformed polynucleotide, it does not matter whether it is inserted into the chromosome of a host cell and located therein or located outside the chromosome, as long as it can be expressed in the host cell. Additionally, the polynucleotide may include DNA and RNA encoding the target protein, and may be introduced in any form, as long as it can be introduced into a host cell and expressed therein. For example, the polynucleotide may be introduced in the form of an expression cassette, which is a gene construct including all of the essential elements required for self-expression, or in the form of a vector including the expression cassette.

The method of transformation may include any method which can introduce a gene encoding the target protein into a cell, and the transformation may be performed by selecting an appropriate standard technique as known in the art according to the host cell. For example, the method may include electroporation, calcium phosphate ($CaPO_4$) precipitation, calcium chloride ($CaCl_2$) precipitation, microinjection, a polyethylene glycol (PEG) method, a DEAE-dextran method, a cationic liposome method, and a lithium acetate-DMSO method, etc., but is not limited thereto.

Yet another aspect of the present application provides a host cell, including: the polynucleotide, and a gene encoding a target protein which is operably linked to the polynucleotide.

Specifically, the host cell may be a microorganism of the genus *Corynebacterium*, and more specifically *Corynebacterium glutamicum*, but is not limited thereto.

The polynucleotide and target protein are as described above.

As used herein, the term "microorganism" is a concept including both a wild-type microorganism, or a naturally or artificially genetically modified microorganism, and it may be a microorganism having a particular weakened or enhanced mechanism due to insertion of a foreign gene or enhancement or weakening of the activity of an endogenous gene. Specifically, it may be a microorganism including the polynucleotide having the promoter activity and the target protein.

The target protein may be a polypeptide having the transketolase (tkt) activity. The polynucleotide having the promoter activity, target protein, polypeptide having the transketolase (tkt) activity, and vector are as described above.

The microorganism may be a microorganism of the genus *Corynebacterium*, and more specifically *Corynebacterium glutamicum*, but is not limited thereto.

The microorganism may be a microorganism expressing transketolase, a microorganism expressing the polypeptide having the transketolase activity, or a microorganism into which the polypeptide having the transketolase activity is introduced, but is not limited thereto.

In the present application, the microorganism may include a polynucleotide having the promoter activity of the present application, and may specifically include the polynucleotide and/or a gene encoding the target protein which is operably linked to the polynucleotide. Alternatively, the microorganism may include a vector containing the polynucleotide or a gene encoding a gene expression regulatory sequence and a target protein, but is not limited thereto. Additionally, the polynucleotide, the gene encoding the target protein and the vector may be introduced into the microorganism by transformation, but is not limited thereto. Further, as long as the gene can be expressed, it does not matter whether the gene encoding the polynucleotide and the target protein is located on the chromosome or located outside the chromosome.

As used herein, the term "to be expressed/expressing" with regard to a protein refers to a state in which a target protein, e.g., transketolase or a variant thereof, is introduced into a microorganism or a target protein is modified to be expressed in a microorganism. When the target protein is a protein present in a microorganism, the term refers to a state in which the activity of the protein is enhanced compared to the activity of its endogenous protein or that before its modification.

Specifically, the term "introduction of a protein" means that a microorganism exhibits an activity of a particular protein which was not originally possessed by the microorganism, or the microorganism exhibits enhanced activity compared to its endogenous activity or the activity of the protein before modification. For example, it may mean that a polynucleotide encoding a particular protein is introduced into the chromosome of a microorganism; or a vector containing a polynucleotide encoding a particular protein is introduced into a microorganism and thereby allows the activity of the particular protein to be exhibited.

Additionally, the term "enhancement of activity" means that the activity of a particular protein possessed by a microorganism is enhanced compared to its endogenous activity or the activity before its modification. The term "endogenous activity" refers to the activity of a particular protein originally possessed by a parent strain before modification, in a case where the trait of the microorganism is altered due to genetic mutation caused by a natural or artificial factor.

For the purpose of the present application, the enhancement of activity may be achieved by using the polynucleotide sequence having the promoter activity of the present application as an expression regulatory sequence of a target protein. Since the target protein may be a natural or modified protein as described above, the expression regulatory sequence may be an expression regulatory sequence of a gene encoding a protein variant, or an expression regulatory sequence of a gene encoding a natural protein on a chromosome.

Additionally, other methods for enhancing the activity may be used in combination. For example, in addition to using the polynucleotide having the promoter activity of the present application as an expression regulatory sequence of a target protein, any one or more methods selected from the group consisting of a method for increasing the intracellular copy number of a gene encoding a target protein; a method for replacing the gene encoding the natural protein on the chromosome with a gene encoding the protein variant; a method for further introducing a mutation into a gene encoding the protein such that the activity of the protein variant is enhanced; and a method for introducing the protein variant into a microorganism, but the method is not limited thereto.

The activity of the target protein may be enhanced by using the polynucleotide having the promoter activity of the present application as an expression regulatory sequence of the target protein in a microorganism.

For example, the activity or concentration of the corresponding protein may be increased by at least 1%, 10%, 25%, 50%, 75%, 100%, 150%, 200%, 300%, 400%, or 500%, and at most 1,000% or 2,000%, based on the activity or concentration of the protein in a wild-type or non-modified microorganism strain, but the range of increase is not limited thereto.

As used herein, the term "non-modified microorganism" does not exclude a strain containing a mutation that may occur naturally in a microorganism, and may be a wild-type strain itself, or may include a microorganism not containing the polynucleotide having the promoter activity of the present application, or a microorganism which is not transformed with a vector containing the polynucleotide having the promoter activity of the present application.

As used herein, the "microorganism for producing a target material" includes all microorganisms in which genetic modification occurs naturally or artificially, and it may be a microorganism in which a particular mechanism is weakened or enhanced due to insertion of a foreign gene, or enhancement or inactivation of the activity of an endogenous gene, and may be a microorganism in which genetic modification occurs to produce a desired product or the activity is enhanced. For the purpose of the present application, the microorganism for producing a target material may refer to a microorganism capable of producing the target material in excess, as compared to a wild-type or non-modified microorganism, including the polynucleotide having the promoter activity of the present application.

The "microorganism for producing a target material" may be used interchangeably with a "microorganism producing a target material", "microorganism having the ability to produce a target material", "strain producing a target material", "strain having the ability to produce a target material", etc.

The target material may be an amino acid, specifically lysine, threonine, O-acetyl homoserine, isoleucine, tryptophan, tyrosine, or phenylalanine. In a more specific example, the lysine, may be L-lysine, the threonine may be L-threonine, the O-acetyl homoserine may be O-acetyl-L-homoserine, the isoleucine may be L-isoleucine, the tryptophan may be L-tryptophan, and tyrosine may be L-tyrosine, the phenylalanine may be L-phenylalanine, but the target material is not limited thereto. For the purpose of the present application, the microorganism for producing a target material may be those in which the ability to produce a target material, specifically lysine, threonine, O-acetyl homoserine, isoleucine, tryptophan, tyrosine, or phenylalanine is enhanced.

Meanwhile, the microorganism for producing a target material may be a wild-type microorganism or a recombinant microorganism. The recombinant microorganism is as described above. The microorganism may further include mutations such as strengthening biosynthetic pathways for increasing the ability to produce target materials, releasing feedback inhibition, or gene inactivation to weaken degradation pathways or biosynthetic pathways, etc., and such mutations may, for example, be artificially caused by UV irradiation, but do not exclude naturally occurring mutations.

Specifically, the microorganism for producing a target material may be mutated such that the target material can be produced. For example, it may be those in which the microorganism having no ability to produce a target material is mutated to have the ability to produce the target material, or it may be a microorganism with enhanced production ability. As an example, it may be a microorganism into which a protein involved in a biosynthetic pathway or a variant thereof is introduced so that a target material can be produced in a wild-type microorganism (KR 10-2011994, KR 10-1947959).

The microorganism of the present application may have the ability to produce a target material of at least 1%, 5%, 10%, 13%, 15%, 16%, 17%, 18%, 19%, 20%, or 25% or more compared to a microorganism not including the polynucleotide having the promoter activity.

Even another aspect of the present application provides a method for producing a target material, including culturing the host cell in a medium; and recovering the target material from the medium.

The host cell and target material are as described above.

As used herein, the term "culturing" means that microorganisms are grown in appropriately, artificially controlled environmental conditions. In the present application, the method for producing a target material using the microorganism including the polynucleotide may be performed by a method well known in the art. Specifically, the culturing may be performed continuously in a batch process, a fed batch or a repeated fed batch process, but is not limited thereto. The media used for culturing must meet the requirements of a particular strain in an appropriate method. The culture media for the strains belonging to the genus *Corynebacterium* are already known (e.g., Manual of Methods for General Bacteriology. American Society for Bacteriology. Washington D.C., USA, 1981).

Examples of the carbon sources may include sugars and carbohydrates such as glucose, sucrose, lactose, fructose, maltose, starch, cellulose, etc.; oils and fats such as soybean oil, sunflower oil, castor oil, coconut oil, etc.; fatty acids such as palmitic acid, stearic acid, linoleic acid, etc.; alcohols such as glycerol and ethanol; and organic acids such as acetic acid. These carbon sources may be used alone or in combination, but are not limited thereto.

Examples of the nitrogen sources may include peptone, yeast extract, meat gravy, malt extract, corn steep liquor (CSL), soybean flour, and urea; or inorganic nitrogen sources such as ammonium sulfate, ammonium chloride, ammonium phosphate, ammonium carbonate, and ammonium nitrate. These nitrogen sources may also be used alone or in combination, but are not limited thereto.

Examples of the phosphorus sources may include potassium dihydrogen phosphate, dipotassium hydrogen phosphate, or corresponding sodium-containing salts. Additionally, the medium may contain metal salts such as magnesium sulfate or iron sulfate which are essential for the growth. Lastly, essential materials for growth such as amino acids and vitamins may be used. Additionally, appropriate precursors may also be contained in the medium. The above materials may be added to the culture in a batch type or continuous type by an appropriate method.

The pH of the culture may be adjusted by appropriately using a basic compound such as sodium hydroxide, potassium hydroxide, and ammonia, or an acidic compound such as phosphoric acid and sulfuric acid. Additionally, an antifoaming agent such as fatty acid polyglycol ester may be added to prevent foam generation. In order to maintain the aerobic state of the culture, oxygen or an oxygen-containing gas (e.g., air) may be injected into the culture.

The temperature of the culture (medium) may generally be from 20° C. to 45° C., and preferably from 25° C. to 40° C., and the culture may be continued until a desired amount of the target material is obtained, and may be specifically carried out for 10 to 160 hours.

The recovery of the target material from the culture (medium) may be separated and recovered by a conventional method known in the art. As the separation method, methods such as centrifugation, filtration, chromatography and crystallization may be used. For example, a supernatant obtained by removing the biomass by centrifuging the culture at low speed may be separated through ion exchange chromatography, but is not limited thereto.

The recovering step may further include a purification process.

Still further another aspect of the present application provides the use of a polynucleotide in which the nucleotides at positions 218, 219, 220, 221, 222, 225, and 227 in the polynucleotide sequence of SEQ ID NO: 1 are substituted with other nucleotides, as a promoter.

The polynucleotide is as described above.

MODE FOR CARRYING OUT THE INVENTION

The present application will be described in detail by way of Examples. However, it will be apparent to those skilled in the art that these Examples are given for illustrative purposes only, and are not intended to limit the scope of the invention thereto.

Example 1. Confirmation of Activity of Inducing Target Gene Expression of New Promoter Example 1-1. Construction of Tkt Promoter Variant Library Using Random Mutagenesis First, according to the U.S. National Institutes of Health's GenBank (NIH GenBank), a nucleotide sequence (SEQ ID NO: 1) containing the promoter region of the tkt gene (NCBI registration number NCgl1512) of the wild type *Corynebacterium glutamicum* ATCC13032 was obtained. The promoter (Pntkt) of the tkt gene consisting of the nucleotide sequence of SEQ ID NO: 1 was used as a template by the Diversify® PCR Random Mutagenesis Kit (takara), and the primers of SEQ ID NOS: 3 and 4 were used to induce random mutagenesis according to the manufacturer's manual to thereby obtain a tkt promoter variant PCR product (Pmtkt) having a different sequence. Additionally, PCR was performed on the ORF (Open Reading Frame) of the GFP gene based on the pGFPuv vector (clontech, USA) as a template using the primers of SEQ ID NOS: 5 and 6. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 58° C. for 30 seconds, and polymerization at 72° C. for 60 seconds, and then polymerization at 72° C. for 5 minutes to obtain a gene fragment containing the ORF of GFP.

The tkt promoter variant PCR product (Pmtkt), the amplified product, and GFP were mixed with pCES208 (*J. Microbiol. Biotechnol.* 18:639-647, 2008), an *E. coli-Corynebacterium* shuttle vector cleaved with BamHI/SalI restriction enzyme, and cloned using the Gibson assembly method (DG Gibson et al., *NATURE METHODS*, Vol. 6 No. 5, May 2009, NEBuilder HiFi DNA Assembly Master Mix) to obtain recombinant plasmids, and each vector was named from pCES208_Pm1tkt_gfp to pCES208_Pm50tkt_gfp. The cloning was performed by mixing the Gibson assembly reagent and each of the gene fragments in a calculated number of moles followed by incubating at 50° C. for 1 hour.

As a control for confirming the activity of the tkt promoter variant library, a recombinant vector in which the promoter (SEQ ID NO: 1) of the wild-type tkt gene and GFP are linked was used. The promoter gene (Pntkt) of the wild-type tkt gene was obtained based on the wild-type *Corynebacterium glutamicum* ATCC13032 as a template using the primers of SEQ ID NOS: 3 and 4. Additionally, PCR was performed on the ORF (Open Reading Frame) of the GFP gene based on the pGFPuv vector as a template using the primers of SEQ ID NOS: 5 and 6. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 58° C. for 30 seconds, and polymerization at 72° C. for 60 seconds, and then polymerization at 72° C. for 5 minutes to obtain a gene fragment containing the ORF of GFP.

The wild-type tkt promoter variant PCR product (Pntkt), the amplified product, and GFP were mixed with pCES208 cleaved with BamHI/SalI restriction enzyme, and cloned using the Gibson assembly method to obtain a recombinant plasmid, and the resulting product was named pCES208_Pntkt_gfp. The cloning was performed by mixing the Gibson assembly reagent and each of the gene fragments in a calculated number of moles followed by incubating at 50° C. for 1 hour.

Example 1-2. Construction of Transformed Strains

The pCES208 vector, and the recombinant vector library including pCES208_Pm1tkt_gfp to pCES208_Pm50tkt_gfp and pCES208_Pntkt_gfp prepared in Example 1-1 were transformed into *Corynebacterium glutamicum* ATCC13032 via electroporation (*Appl. Microbiol. Biothcenol.* (1999) 52:541-545), and then the transformed strains was obtained in a selection medium containing 25 mg/L kanamycin, and the resulting strains were named ATCC13032/pCES208, ATCC13032/pCES208_Pm1tkt_gfp to ATCC13032/pCES208_Pm50tkt_gfp, and ATCC13032/pCES208_Pntkt_gfp, respectively.

Example 1-3. Selection of tkt Promoter Variant

In order to confirm the activity of the tkt promoter variant, the transformed strains obtained in Example 1-2 were cultured in the following manner, and the GFP activity was measured.

Specifically, each of the transformed *Corynebacterium glutamicum* strains was inoculated into a flask containing 25 mL of a culture medium (glucose (20 g), ammonium sulfate (5 g), yeast extract (5 g), urea (1.5 g), $KH_2PO_4$ (4 g), $K_2HPO_4$ (8 g), $MgSO_4·7H_2O$ (0.5 g), biotin (150 μg), thiamine-HCl (1.5 mg), calcium pantothenate (3 mg), and nicotinamide (3 mg) (based on 1 L of distilled water), pH 7.2) and cultured in an incubator at 30° C. for 20 hours with shaking. The bacterial cells were recovered by centrifugation (5,000 rpm, 15 minutes), washed twice with 50 mM Tris-HCl (pH 8.0) buffer, and suspended in the same buffer. Glass beads were added to the suspension in an amount of 1.25 g/1.5 mL, and the bacterial cells were disrupted using a bead beater for 6 minutes. Then, the resultant was subjected to centrifugation (15,000 rpm, 20 minutes) to recover the supernatant therefrom, and the concentrations of proteins were quantitated by way of the Bradford method. For an equal amount of bacterial cell extracts, irradiation with an excitation light at 488 nm was performed according to a method introduced by Laure Gory et al. (*FEMS Microbiology Letters* 194, 127-133, 2001), and the emitted light at 511 nm was measured using the LS-50B spectrophotometer (Perkin-Elmer), and thereby the expression level of the GFP gene was measured. As a result, compared with the GFP gene expression level of the control ATCC13032/pCES208_Pntkt_gfp strain, one strain having the highest GFP gene expression level was selected (Table 1).

TABLE 1

| Strain | Fluorescence Sensitivity |
| --- | --- |
| ATCC13032/pCES208 | 0 |
| ATCC13032/pCES208_Pntkt_gfp | 1321 |
| ATCC13032/pCES208_Pm4tkt_gfp | 2967 |

As shown in Table 1, it was confirmed that the Pm4tkt promoter exhibited promoter activity in *Corynebacterium glutamicum*, and exhibited higher fluorescence sensitivity than the wild-type tkt promoter.

In order to confirm the mutation introduced into the Pm4tkt promoter selected above, PCR was performed using the primers of SEQ ID NOS: 7 and 8, and then sequence analysis was performed. The Pm4tkt promoter was compared with SEQ ID NO: 1, which is the wild-type tkt promoter sequence, to confirm the sequence of the tkt promoter variant, and the sequence is shown in Table 2 below.

TABLE 2

| SEQ ID NO: | Variant | Sequence |
| --- | --- | --- |
| 2 | Pm4tkt | GCTTGCCGAACATTTTTCTTTTCCTTTCGGTTTTTCGA |
| | | GAATTTTCACCTACAAAAGCCCACGTCACAGCTCCCAG |
| | | ACTTAAGATTGATCACACCTTTGACACATTTGAACCAC |
| | | AGTTGGTTATAAAATGGGTTCAACATCACTATGGTTAG |
| | | AGGTGTTGACGGGTCAGATTAAGCAAAGACTACTTTCG |
| | | GGGTAGATCACCTTTGCCAAATTTGAATGTGGTATCAT |
| | | AAGTCGTAGATCTGATCATCGGATCTAACGAAAACGAA |
| | | CCAAAACTTTGGTCCCGGTTTAACCCAGGAAGGA |

Example 2. Construction of Vector for Introduction of Pm4tkt Promoter Variant

Example 2-1. Construction of Vector for Introduction of Pm4tkt

Promoter Variant into *Corynebacterium glutamicum* ATCC13032 In order to construct a vector for introducing the Pm4tkt promoter variant into *Corynebacterium glutamicum* ATCC13032, an upstream region of the tkt promoter and a downstream region including a portion of the ORF of tkt were obtained based on the chromosome of the wild-type *Corynebacterium glutamicum* ATCC13032 as a template using the primer pairs of SEQ ID NOS: 9 and 10 and SEQ ID NOS: 13 and 14. In addition, PCR products corresponding to the promoter variant were obtained based on the pCES208_Pm4tkt_gfp vector as a template using SEQ ID NOS: 11 and 12. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 58° C. for 30 seconds, and polymerization at 72° C. for 60 seconds, and then polymerization at 72° C. for 5 minutes to thereby obtain PCR products. The three amplified products were mixed with the pDCM2 vector (Korean Patent Application Publication No. 10-2020-0136813) previously cleaved by SmaI restriction enzyme and cloned using the Gibson assembly method to obtain a recombinant plasmid, and the resulting product was named pDCM2-Pm4tkt_tkt. The cloning was performed by mixing the Gibson assembly reagent and each of the gene fragments in a calculated number of moles followed by incubating at 50° C. for 1 hour.

Example 2-2. Construction of Vector for Introduction of Pm4tkt_tkt into *Corynebacterium glutamicum* ATCC13869

A vector for introducing one copy of the tkt gene having the Pm4tkt promoter variant (SEQ ID NO: 2) into *Corynebacterium glutamicum* ATCC13869 was prepared.

A vector for inserting the target gene while deleting the aroP (gamma-aminobutyrate permease, GenBank Accession No. WP_060564335.1) position of *Corynebacterium glutamicum* ATCC13869 as a position where homologous recombination occurs on the chromosome was prepared.

Specifically, gene fragments in the upstream and downstream regions of aroP where homologous recombination occurs on chromosomes were obtained through PCR based on the chromosomal DNA of *Corynebacterium glutamicum* ATCC13869 using the primer pairs of SEQ ID NOS: 15 and 16 and SEQ ID NOS: 17 and 18. Solg™ Pfu-X DNA polymerase was used as the polymerase, and PCR was performed under PCR amplification conditions of denaturation at 95° C. for 5 minutes, followed by 30 cycles of denaturation at 95° C. for 30 seconds, annealing at 58° C. for 30 seconds, and polymerization at 72° C. for 60 seconds, and then polymerization at 72° C. for 5 minutes.

The upstream and downstream regions of the amplified aroP, and the pDCM2 vector for chromosomal transformation cleaved by SmaI restriction enzyme were cloned using the Gibson assembly method to obtain a recombinant plasmid, and the resulting product was named pDCM2-ΔaroP. The cloning was performed by mixing the Gibson assembly reagent and each of the gene fragments in a calculated number of moles, followed by incubating at 50° C. for 1 hour.

PCR was performed using the primers of SEQ ID NOS: 19 and 20 based on the pCES208_Pm4tkt_gfp as a template, and a gene fragment having the Pm4tkt promoter variant was obtained through PCR. Additionally, the ORF of the tkt gene was obtained using the primers of SEQ ID NOS: 21 and 22 based on the chromosomal DNA of *Corynebacterium glutamicum* ATCC13869 as a template. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 58° C. for 30 seconds, and polymerization at 72° C. for 60 seconds, and then polymerization at 72° C. for 5 minutes.

The amplified Pm4tkt, tkt gene and pDCM2-ΔaroP vector for chromosomal transformation cleaved by ScaI restriction enzyme were cloned using the Gibson assembly method to obtain a recombinant plasmid, and the resulting product was named pDCM2-ΔaroP::Pm4tkt_tkt. The cloning was performed by mixing the Gibson assembly reagent and each of the gene fragments in a calculated number of moles, followed by incubating at 50° C. for 1 hour.

Additionally, for comparison with the Pm4tkt promoter, a vector for adding one copy of the tkt gene in the form of its own promoter (Pntkt) of the tkt gene was prepared. Specifically, PCR was performed using the primers of SEQ ID NOS: 19 and 22 based on the chromosomal DNA of *Corynebacterium glutamicum* ATCC13869 as a template, and a tkt gene having its own promoter of the tkt gene was obtained. The thus-obtained gene and the above-prepared pDCM2-ΔaroP vector for chromosomal transformation cleaved by ScaI restriction enzyme were cloned using the Gibson assembly method to obtain a recombinant plasmid, and the resulting product was named pDCM2-ΔaroP::Pntkt_tkt. The cloning was performed by mixing the Gibson assembly reagent and each of the gene fragments in a calculated number of moles, followed by incubating at 50° C. for 1 hour.

Example 2-3. Construction of Vector for Introduction of Pm4tkt

Promoter Variant into *Corynebacterium glutamicum* ATCC13869 In order to replace the native promoter of the tkt gene previously introduced into the aroP position with the Pm4tkt promoter variant, PCR was performed based on the pDCM2-ΔaroP::Pm4tkt_tkt vector prepared in Example 2-2 as a template using SEQ ID NOS: 23 and 24, and a gene fragment including the Pm4tkt sequence was obtained. The thus-obtained gene fragment was mixed with the pDCM2 vector cleaved by SmaI restriction enzyme and cloned using the Gibson assembly method to obtain a recombinant plasmid, and the resulting product was named pDCM2-ΔPn::Pm4tkt_tkt. The cloning was performed by mixing the Gibson assembly reagent and each of the gene fragments in a calculated number of moles, followed by incubating at 50° C. for 1 hour.

Example 3. Evaluation of Production Ability of Target Products 3-1. Evaluation of Lysine-Producing Ability 3-1-1. Construction of L-Lysine-Producing Strain into which Tkt Promoter Variant is Introduced A strain transformed with the tkt promoter variant was prepared using the pDCM2-Pm4tkt_tkt vector prepared in Example 2-1. To this end, the vector was transformed into *Corynebacterium glutamicum* CJ3P (U.S. Pat. No. 9,556, 463 B2), which is an L-lysine-producing strain, to introduce the tkt promoter variant sequence into the chromosome. The CJ3P strain is a *Corynebacterium glutamicum* strain having an L-lysine producing ability due to introduction of three types of mutations (pyc(P458S), hom(V59A) and lysC (T311I)) into a wild-type strain based on the previously known techniques.

Specifically, the vector prepared in Example 2-1 was transformed into the CJ3P strain via electroporation, and then the transformed strain was obtained in a selection medium containing 25 mg/L kanamycin. Through secondary crossover, the strain into which the tkt promoter variant was introduced by the DNA fragment inserted on the chromosome was selected by performing PCR using the primers of SEQ ID NOS: 7 and 8 and sequencing, and the thus-selected strain was named *Corynebacterium glutamicum* CJ3P:: Pm4tkt_tkt(CM03-1661) and was deposited at the Korean Culture Center of Microorganisms under the Budapest Treaty on Apr. 5, 2021, with Accession No. KCCM12971P.

3-1-2. Evaluation of L-Lysine Producing Ability of Strain Introduced with Tkt Promoter Variant In order to evaluate the L-lysine producing ability of the *Corynebacterium glutamicum* CJ3P strain used as the parent strain and the *Corynebacterium glutamicum* CJ3P:: Pm4tkt_tkt strain prepared in Example 3-1-1, the strains were cultured in the following manner and analyzed.

First, each strain was seeded into a 250 mL corner-baffle flask containing 25 mL of a seed medium and cultured at 30° C. for 20 hours at 200 rpm with shaking. Then, 1 mL of the seed culture solution was seeded into a 250 mL corner-baffle flask containing 24 mL of a production medium and cultured at 32° C. for 48 hours at 200 rpm with shaking. Compositions of the nutrient medium, seed medium, and production medium are shown below.

<Seed Medium (pH 7.0)>

Glucose 20 g, Peptone 10 g, Yeast Extract 5 g, Urea 1.5 g, $KH_2PO_4$ 4 g, $K_2HPO_4$ 8 g, $MgSO_4 \cdot 7H_2O$ 0.5 μg, Biotin 100 μg, Thiamine-HCl 1000 μg, Calcium Pantothenate 2000 μg, Nicotinamide 2000 μg (based on 1 L of distilled water)

<Production Medium (pH 7.0)>

Glucose 45 g, Soybean Protein 10 g, Molasses 10 g, $(NH_4)_2SO_4$ 15 g, $KH_2PO_4$ 0.55 g, $MgSO_4 \cdot 7H_2O$ 0.6 g, $FeSO_4 \cdot 7H_2O$ 9 mg, $MnSO_4 \cdot 5H_2O$ 9 mg, Biotin 0.9 mg, Thiamine-HCl 4.5 mg, $CaCO_3$ 30 g, Calcium Pantothenate 4.5 mg, Nicotinamide 30 mg, ZnSO$_4$ 0.45 mg, CuSO$_4$ 0.45 mg (based on 1 L of distilled water)

After completion of the culture, the production of L-lysine was measured using HPLC. The L-lysine concentration and concentration increase rate in the culture medium for the Corynebacterium glutamicum CJ3P and CJ3P::Pm4tkt_tkt strains are shown in Table 3 below.

TABLE 3

| Name of Strain | L-Lysine Concentration (g/L) | L-Lysine Concentration Increase Rate (%) |
|---|---|---|
| CJ3P | 4.03 | — |
| CJ3P::Pm4tkt_tkt | 4.99 | 23.82% |

As shown in Table 3, it was confirmed that the L-lysine concentration of the CJ3P::Pm4tkt_tkt strain into which the tkt promoter variant was introduced was increased by 23.82% compared to the parent strain CJ3P.

Example 3-2. Evaluation of Threonine Producing Ability 3-2-1. Construction of L-Threonine-Producing Strain In order to construct a strain transformed with the tkt promoter variant using the pDCM2-Pm4tkt_tkt vector prepared in Example 2-1, first, an L-threonine-producing strain, into which the lysC (L377K) mutant (Korea Patent No. 10-2011994) and the hom (R398Q) mutant (Korean Patent No. 10-1947959) were introduced, was prepared based on the Corynebacterium glutamicum ATCC13032 strain.

Specifically, in order to prepare an L-threonine-producing strain, first, a vector for introducing lysC (L377K) was prepared. In order to prepare the vector, PCR was performed using the primer pairs of SEQ ID NOS: 25 and 26 and SEQ ID NOS: 27 and 28 based on the chromosome of the wild-type Corynebacterium glutamicum ATCC13032 strain as a template. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 58° C. for 30 seconds, and polymerization at 72° C. for 60 seconds, and then polymerization at 72° C. for 5 minutes. The amplified product and the pDCM2 vector for chromosomal transformation cleaved by SmaI restriction enzyme were cloned using the Gibson assembly method to obtain a recombinant plasmid, and the resulting product was named pDCM2-lysC(L377K). The cloning was performed by mixing the Gibson assembly reagent and each of the gene fragments in a calculated number of moles, followed by incubating at 50° C. for 1 hour.

The thus-prepared pDCM2-lysC(L377K) vector was introduced into the Corynebacterium glutamicum ATCC13032 strain via electroporation, and then the transformed strain was obtained in a selection medium containing 25 mg/L kanamycin. Through secondary crossover, the strain in which the nucleotide mutation was introduced into the lysC gene by the DNA fragment inserted on the chromosome was selected by performing PCR using the primers of SEQ ID NOS: 29 and 30 and sequencing, and the selected strain was named ATCC13032::lysC(L377K).

In addition, in order to prepare a vector for introducing hom(R398Q), PCR was performed using the primer pairs of SEQ ID NOS: 31 and 32 and SEQ ID NOS: 33 and 34 based on the chromosome of the Corynebacterium glutamicum ATCC13032 strain as a template. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 58° C. for 30 seconds, and polymerization at 72° C. for 60 seconds, and then polymerization at 72° C. for 5 minutes. The amplified product and the pDCM2 vector for chromosomal transformation cleaved by SmaI restriction enzyme were cloned using the Gibson assembly method to obtain a recombinant plasmid, and the resulting product was named pDCM2-hom (R398Q). The cloning was performed by mixing the Gibson assembly reagent and each of the gene fragments in a calculated number of moles, followed by incubating at 50° C. for 1 hour.

The pDCM2-hom(R398Q) vector prepared above was introduced into the Corynebacterium glutamicum ATCC13032::lysC(L377K) strain via electroporation, and then the transformed strain was obtained in a selection medium containing 25 mg/L kanamycin. Through secondary crossover, the strain in which the nucleotide mutation was introduced into the hom gene by the DNA fragment inserted on the chromosome was selected by performing PCR using the primers of SEQ ID NOS: 35 and 36 and sequencing, and the selected strain was named Corynebacterium glutamicum ATCC13032::lysC(L377K)-hom(R398Q).

3-2-2. Construction of L-Threonine-Producing Strain Introduced with tkt Promoter Variant The pDCM2-Pm4tkt_tkt vector prepared in Example 2-1 was introduced into the Corynebacterium glutamicum ATCC13032::lysC(L377K)-hom(R398Q) strain via electroporation, and then the transformed strain was obtained in a selection medium containing 25 mg/L kanamycin. Through secondary crossover, the strain in which the tkt promoter variant was introduced by the DNA fragment inserted on the chromosome was selected by performing PCR using the primers of SEQ ID NOS: 7 and 8 and sequencing, and the selected strain was named Corynebacterium glutamicum ATCC13032::lysC(L377K)-hom (R398Q)-Pm4tkt_tkt.

3-2-3. Evaluation of L-Threonine Producing Ability of Strain Introduced with tkt Promoter Variant In order to evaluate the L-threonine producing ability of Corynebacterium glutamicum ATCC13032::lysC(L377K)-hom(R398Q) used as the parent strain and ATCC13032::lysC(L377K)-hom(R398Q)-Pm4tkt_tkt prepared in Example 3-2-2, the strains were cultured in the following manner and analyzed.

First, each strain was seeded into a 250 mL corner-baffle flask containing 25 mL of a seed medium and cultured at 30° C. for 20 hours at 200 rpm with shaking. Then, 1 mL of the seed culture solution was seeded into a 250 mL corner-baffle flask containing 24 mL of a production medium and cultured at 32° C. for 48 hours at 200 rpm with shaking. Compositions of the nutrient medium, seed medium, and production medium are shown below.

<Seed Medium (pH 7.0)>

Glucose 20 g, Peptone 10 g, Yeast Extract 5 g, Urea 1.5 g, KH$_2$PO$_4$ 4 g, K$_2$HPO$_4$ 8 g, MgSO$_4$·7H$_2$O 0.5 g, Biotin 100 μg, Thiamine-HCl 1000 μg, Calcium Pantothenate 2000 μg, Nicotinamide 2000 μg (based on 1 L of distilled water)

<Production Medium (pH 7.0)>

Glucose 45 g, Soybean Protein 10 g, Molasses 10 g, (NH$_4$)$_2$SO$_4$ 15 g, KH$_2$PO$_4$ 0.55 g, MgSO$_4$·7H$_2$O 0.6 g, FeSO$_4$·7H$_2$O 9 mg, MnSO$_4$·5H$_2$O 9 mg, Biotin 0.9 mg, Thiamine-HCl 4.5 mg, CaCO$_3$ 30 g, Calcium Pantothenate 4.5 mg, Nicotinamide 30 mg, ZnSO$_4$ 0.45 mg, CuSO$_4$ 0.45 mg (based on 1 L of distilled water)

After completion of the culture, the production of L-threonine was measured using HPLC. The L-threonine concentration and concentration increase rate in the culture medium for the *Corynebacterium glutamicum* ATCC13032:: lysC(L377K)-hom(R398Q) and ATCC13032::lysC (L377K)-hom(R398Q)-Pm4tkt_tkt strains are shown in Table 4 below.

TABLE 4

| Name of Strains | L-Threonine Concentration (g/L) | L-Threonine Concentration Increase Rate (%) |
|---|---|---|
| ATCC13032::lysC(L377K)-hom(R398Q) | 0.92 | — |
| ATCC13032::lysC(L377K)-hom(R398Q)-Pm4tkt_tkt | 1.30 | 41.30% |

As shown in Table 4, the concentration of L-threonine was increased by 41.30% in the ATCC13032::lysC(L377K)-hom(R398Q)-Pm4tkt_tkt strain into which the tkt promoter variant was introduced as compared to ATCC13032::lysC (L377K)-hom(R398Q), the parent strain.

Example 3-3. Evaluation of O-Acetyl Homoserine Producing Ability 3-3-1. Construction of O-Acetyl Homoserine-Producing Strain Introduced with Tkt Promoter Variant The pDCM2-Pm4tkt_tkt vector prepared in Example 2-1 was introduced into the wild-type *Corynebacterium glutamicum* ATCC13032 strain via electroporation, and then the transformed strain was obtained in a selection medium containing 25 mg/L kanamycin. Through secondary crossover, the strain in which the tkt promoter variant was introduced by the DNA fragment inserted on the chromosome was selected by performing PCR using the primers of SEQ ID NOS: 7 and 8 and sequencing, and the selected strain was named *Corynebacterium glutamicum* ATCC13032::Pm4tkt_tkt.

3-3-2. Evaluation of O-Acetyl Homoserine Producing Ability of Strain Introduced with tkt Promoter Variant In order to evaluate the O-acetyl homoserine producing ability of *Corynebacterium glutamicum* ATCC13032 used as the parent strain and ATCC13032::Pm4tkt_tkt prepared in Example 3-3-1, the strains were cultured in the following manner and analyzed.

The above strains was inoculated into a 250 mL corner-baffled flask containing 25 mL of the medium below using an inoculation loop, and then cultured with shaking at 200 rpm at 33° C. for 20 hours.

<Production Medium (pH 7.2)>

Glucose 30 g, KH$_2$PO$_4$ 2 g, Urea 3 g, (NH$_4$)$_2$SO$_4$ 40 g, Peptone 2.5 g, CSL (Corn steep liquor, Sigma) 5 g (10 mL), MgSO$_4$·7H$_2$O 0.5 g, CaCO$_3$ 20 g (based on 1 L of distilled water)

After completion of the culture, the O-acetyl homoserine producing ability was measured by HPLC. The O-acetyl homoserine concentration and concentration increase rate in the culture medium for *Corynebacterium glutamicum* ATCC13032 and ATCC13032::Pm4tkt_tkt strains are shown in Table 5 below.

TABLE 5

| Name of Strains | O-Acetyl Homoserine Concentration (g/L) | O-Acetyl Homoserine Concentration Increase Rate (%) |
|---|---|---|
| ATCC13032 | 0.28 | — |
| ATCC13032::Pm4tkt_tkt | 0.41 | 46.43% |

As shown in Table 5, it was confirmed that the concentration of O-acetyl homoserine was increased by 46.43% in the ATCC13032::Pm4tkt_tkt strain into which the tkt promoter variant was introduced compared to the wild-type ATCC13032 strain, the parent strain.

Example 3-4. Evaluation of Isoleucine Producing Ability 3-4-1. Construction of L-Isoleucine-Producing Strain Introduced with tkt Promoter Variant In order to prepare a strain transformed with the tkt promoter variant using the pDCM2-Pm4tkt_tkt vector prepared in Example 2-1, first, the vector was transformed into the *Corynebacterium glutamicum* CJP1 (Korean Patent No. 10-1996769) strain, and the tkt promoter variant sequence was introduced into the chromosome thereof. Thereafter, the vector containing the ilvA gene (V323A) (*Appl. Enviro. Microbiol.*, December 1996, pp. 4345-4351) in which valine, which is the 323$^{rd}$ amino acid of the ilvA gene encoding the previously known L-threonine dehydratase, is mutated to alanine was further introduced to thereby prepare an L-isoleucine-producing strain (Korean Patent No. 10-1996769).

Specifically, the pDCM2-Pm4tkt_tkt vector prepared in Example 2-1 was introduced into the CJP1 strain via electroporation, and then the transformed strain was obtained in a selection medium containing 25 mg/L kanamycin. Through secondary crossover, the strain in which the tkt promoter variant was introduced by the DNA fragment inserted on the chromosome was selected by performing PCR using the primers of SEQ ID NOS: 7 and 8 and sequencing, and the selected strain was named *Corynebacterium glutamicum* CJP1::Pm4tkt_tkt.

The pECCG117-ilvA(V323A) vector was each introduced into the CJP1::Pm4tkt_tkt strain prepared above and the CJP1 strain, and then the transformed strains were obtained in a selection medium containing 25 mg/L kanamycin. The selected strains were named *Corynebacterium glutamicum* CJP1/pECCG117-ilvA(V323A) and CJP1:: Pm4tkt_tkt/pECCG117-ilvA(V323A), respectively.

3-4-2. Evaluation of L-Isoleucine Producing Ability of Strain Introduced with tkt Promoter Variant In order to evaluate the L-isoleucine producing ability of *Corynebacterium glutamicum* CJP1/pECCG117-ilvA (V323A) used as the parent strain and CJP1::Pm4tkt_tkt/ pECCG117-ilvA(V323A) strain, the strains were cultured in the following manner and analyzed.

First, each strain was seeded into a 250 mL corner-baffle flask containing 25 mL of a seed medium and cultured at 30° C. for 20 hours at 200 rpm with shaking. Then, 1 mL of the seed culture solution was seeded into a 250 mL corner-baffle flask containing 24 mL of a production medium and cultured at 32° C. for 48 hours at 200 rpm with shaking. Compositions of the nutrient medium, seed medium, and production medium are shown below.

<Seed Medium (pH 7.0)>

Glucose 20 g, Peptone 10 g, Yeast Extract 5 g, Urea 1.5 g, KH$_2$PO$_4$ 4 g, K$_2$HPO$_4$ 8 g, MgSO$_4$·7H$_2$O 0.5 g, Biotin 100 µg, Thiamine-HCl 1000 µg, Calcium Pantothenate 2000 µg, Nicotinamide 2000 µg (based on 1 L of distilled water)

<Production Medium (pH 7.0)>

Glucose 45 g, Soybean Protein 10 g, Molasses 10 g, (NH$_4$)$_2$SO$_4$ 15 g, KH$_2$PO$_4$ 0.55 g, MgSO$_4$·7H$_2$O 0.6 g, FeSO$_4$·7H$_2$O 9 mg, MnSO$_4$·5H$_2$O 9 mg, Biotin 0.9 mg, Thiamine-HCl 4.5 mg, CaCO$_3$ 30 g, Calcium Pantothenate 4.5 mg, Nicotinamide 30 mg, ZnSO$_4$ 0.45 mg, CuSO$_4$ 0.45 mg (based on 1 L of distilled water)

After completion of the culture, the production of L-isoleucine was measured using HPLC. The L-isoleucine concentration and concentration increase rate in the culture medium for Corynebacterium glutamicum CJP1/pECCG117-ilvA(V323A) and CJP1::Pm4tkt_tkt/pECCG117-ilvA(V323A) strains are shown in Table 6 below.

TABLE 6

| Name of Strain | L-Isoleucine Concentration (g/L) | L-Isoleucine Concentration Increase Rate (%) |
| --- | --- | --- |
| CJP1/pECCG117-ilvA(V323A) | 0.68 | — |
| CJP1::Pm4tkt_tkt/pECCG117-ilvA(V323A) | 1.07 | 57.35% |

As shown in Table 6, it was confirmed that the L-isoleucine concentration was increased by 57.35% in the CJP1::Pm4tkt_tkt/pECCG117-ilvA(V323A) strain into which the tkt promoter variant was introduced, as compared to the CJP1/pECCG117-ilvA(V323A) strain.

Example 3-5. Evaluation of Tryptophan Producing Ability 3-5-1. Construction of L-Tryptophan-Producing Strain In order to confirm the effect of the Pm4tkt promoter variant, first, an L-tryptophan-producing strain was prepared based on the wild-type Corynebacterium glutamicum ATCC13869 strain.

Specifically, the expression of the L-tryptophan biosynthesis gene operon was enhanced through promoter enhancement. Additionally, in order to release the feedback inhibition of the TrpE protein, serine, the 38$^{th}$ amino acid of trpE, was substituted with arginine (*JOURNAL OF BACTERIOLOGY*, November 1987, pp. 5330-5332).

For the genetic manipulation, upstream and downstream regions of trpE promoter where homologous recombination occurs on the chromosome were first obtained. Specifically, a gene fragment in the upstream region of the trpE promoter was obtained using the primers of SEQ ID NOS: 37 and 38, and a gene fragment in the downstream region was obtained using the primers of SEQ ID NOS: 41 and 42, based on the chromosomal DNA of Corynebacterium glutamicum ATCC13869 as a template through PCR. Additionally, PCR was performed using the primers of SEQ ID NOS: 39 and 40 based on the synthesized promoter SPL7 (Korea Patent No. 10-1783170) and trpE(S38R) sequence (SEQ ID NO: 43) as templates. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 58° C. for 30 seconds, and polymerization at 72° C. for 60 seconds, and then polymerization at 72° C. for 5 minutes.

The three amplified products and the pDCM2 vector for chromosomal transformation cleaved by SmaI restriction enzyme were cloned using the Gibson assembly method to obtain a recombinant plasmid, and the resulting product was named pDCM2-PSPL7_trpE(S38R). The cloning was performed by mixing the Gibson assembly reagent and each of the gene fragments in a calculated number of moles followed by incubating at 50° C. for 1 hour.

The pDCM2-PSPL7_trpE(S38R) vector prepared above was introduced into the wild-type Corynebacterium glutamicum ATCC13869 strain via electroporation, and then the transformed strain was obtained in a selection medium containing 25 mg/L kanamycin. Through secondary crossover, a strain in which the promoter of trpE was replaced with the stronger SPL7 promoter on the chromosome, and serine, which is the 38$^{th}$ amino acid of TrpE, was replaced with arginine, was obtained. The corresponding genetic manipulation was confirmed through genome sequencing and PCR using SEQ ID NOS: 44 and 45 capable of amplifying the upstream and downstream regions of homologous recombination into which the gene was inserted, and the resulting product was named Corynebacterium glutamicum ATCC13869::PSPL7_trpE(S38R).

3-5-2. Construction of L-Tryptophan-Producing Strain Introduced with One Copy of tkt Gene Tryptophan production occurs via the aromatic amino acid metabolic pathway, and this metabolic pathway starts from the condensation reaction between phosphoenolpyruvate and erythrose 4-phosphate. Accordingly, a sufficient supply of these two precursors is essential for the enhancement of the production of tryptophan, and the overexpression of the tkt gene is essential for the sufficient supply of erythrose 4-phosphate, which is known to be relatively deficient. Thus, an L-tryptophan-producing strain was prepared using pDCM2-ΔaroP, pDCM2-ΔaroP::Pm4tkt_tkt and pDCM2-ΔaroP::Pntkt_tkt prepared in Example 2-2.

The above three vectors were introduced into the Corynebacterium glutamicum ATCC13869::PSPL7_trpE(S38R) strain prepared in Example 3-5-1, and then the transformed strain was obtained in a selection medium containing 25 mg/L kanamycin. Through secondary crossover, strains in which the aroP is deleted, or the Pntkt_tkt gene and Pm4tkt_tkt gene are inserted on the aroP position on the chromosome were obtained. The corresponding genetic manipulation was confirmed through genome sequencing and PCR using SEQ ID NOS: 46 and 47, and the thus-prepared strains were named ATCC13869::PSPL7_trpE (S38R)ΔaroP, ATCC13869::PSPL7_trpE(S38R)ΔaroP::Pntkt_tkt and ATCC13869::PSPL7_trpE(S38R)ΔaroP::Pm4tkt_tkt, respectively.

3-5-3. Evaluation of L-Tryptophan-Producing Ability of Strain Introduced with One Copy of tkt Gene In order to evaluate the L-tryptophan producing ability of the Corynebacterium glutamicum ATCC13869::PSPL7_trpE(S38R) used as the parent strain, and ATCC13869::PSPL7_trpE(S38R)ΔaroP, ATCC13869::PSPL7_trpE(S38R)ΔaroP::Pntkt_tkt, and ATCC13869::PSPL7_trpE(S38R)ΔaroP::Pm4tkt_tkt prepared in Example 3-5-2, the strains were cultured in the following manner and analyzed.

First, each strain was seeded into a 250 mL corner-baffle flask containing 25 mL of a seed medium and cultured at 30° C. for 20 hours at 200 rpm with shaking. Then, 1 mL of the seed culture solution was seeded into a 250 mL corner-baffle flask containing 24 mL of a production medium and cultured at 32° C. for 48 hours at 200 rpm with shaking. Compositions of the nutrient medium, seed medium, and production medium are shown below.
<Seed Medium (pH 7.0)>
Glucose 20 g, Peptone 10 g, Yeast Extract 5 g, Urea 1.5 g, $KH_2PO_4$ 4 g, $K_2HPO_4$ 8 g, $MgSO_4·7H_2O$ 0.5 g, Biotin 100 µg, Thiamine-HCl 1000 µg, Calcium Pantothenate 2000 µg, Nicotinamide 2000 µg (based on 1 L of distilled water)
<Production Medium (pH 7.0)>
Glucose 30 g, $(NH_4)_2SO_4$ 15 g, $MgSO_4$ $7H_2O$ 1.2 g, $KH_2PO_4$ 1 g, Yeast Extract 5 g, Biotin 900 µg, Thiamine-HCl 4500 µg, Calcium Pantothenate 4500 µg, $CaCO_3$ 30 g (based on 1 L of distilled water).

After completion of the culture, the production of L-tryptophan was measured using HPLC. The L-tryptophan concentration and concentration increase rate in the culture medium for *Corynebacterium glutamicum* ATCC13869::PSPL7_trpE(S38R), ATCC13869::PSPL7_trpE(S38R)ΔaroP, ATCC13869::PSPL7_trpE(S38R)ΔaroP::Pntkt_tkt, and ATCC13869::PSPL7_trpE(S38R)ΔaroP::Pm4tkt_tkt strains are shown in Table 7 below.

TABLE 7

| Name of Strains | L-Tryptophan Concentration (g/L) | L-Tryptophan Concentration Increase Rate (%) |
|---|---|---|
| ATCC13869::PSPL7_trpE(S38R) | 0.21 | — |
| ATCC13869::PSPL7_trpE(S38R)ΔaroP | 0.24 | — |
| ATCC13869::PSPL7_trpE(S38R)ΔaroP::Pntkt_tkt | 0.30 | 25.00% |
| ATCC13869::PSPL7_trpE(S38R)ΔaroP::Pm4tkt_tkt | 0.39 | 62.50% |

As shown in Table 7, it was confirmed that the L-tryptophan concentration was increased by 62.50% in the ATCC13869::PSPL7_trpE(S38R)ΔaroP::Pm4tkt_tkt strain into which one copy of the Pm4tkt_tkt gene was introduced, compared to the ATCC13869::PSPL7_trpE(S38R)ΔaroP strain, the control.

Example 3-6. Evaluation of Tyrosine Producing Ability 3-6-1. Construction of L-Tyrosine-Producing Strain In order to confirm the effect of the Pm4tkt promoter variant, transformation was performed using the L-tyrosine producing strain CM06-0010 (Korean Patent No. 10-2134418, deposited at Korean Culture Center of Microorganisms with Accession No. KCCM12487P) as the parent strain.

Specifically, the pDCM2-ΔPn::Pm4tkt_tkt vector prepared in Example 2-3 was introduced into the CM06-0010 strain via electroporation, and then the transformed strain was obtained in a selection medium containing 25 mg/L kanamycin. Through secondary crossover, the strain in which the tkt native promoter (Pntkt) was replaced with the tkt promoter variant by the DNA fragment inserted on the chromosome was obtained. The corresponding genetic manipulation was confirmed through genome sequencing and PCR using SEQ ID NOS: 48 and 49, and the thus-prepared strain was named CM06-0010ΔPn::Pm4tkt_tkt.
3-6-2. Evaluation of L-Tyrosine Producing Ability of Strain Introduced with tkt Promoter Variant In order to evaluate the L-tyrosine producing ability of the *Corynebacterium glutamicum* CM06-0010 used as the parent strain, and CM06-0010ΔPn::Pm4tkt_tkt prepared in Example 3-6-1, the strains were cultured in the following manner and analyzed.

First, each strain was seeded into a 250 mL corner-baffle flask containing 25 mL of a seed medium and cultured at 30° C. for 20 hours at 200 rpm with shaking. Then, 1 mL of the seed culture solution was seeded into a 250 mL corner-baffle flask containing 24 mL of a production medium and cultured at 32° C. for 48 hours at 200 rpm with shaking. Compositions of the nutrient medium, seed medium, and production medium are shown below.
<Seed Medium (pH 7.0)>
Glucose 20 g, Peptone 10 g, Yeast Extract 5 g, Urea 1.5 g, $KH_2PO_4$ 4 g, $K_2HPO_4$ 8 g, $MgSO_4·7H_2O$ 0.5 g, Biotin 100 µg, Thiamine-HCl 1000 µg, Calcium Pantothenate 2000 µg, Nicotinamide 2000 µg (based on 1 L of distilled water)
<Production Medium (pH 7.0)>
Glucose 30 g, $(NH_4)_2SO_4$ 15 g, $MgSO_4$ $7H_2O$ 1.2 g, $KH_2PO_4$ 1 g, Yeast Extract 5 g, Biotin 900 µg, Thiamine-HCl 4500 µg, Calcium Pantothenate 4500 µg, $CaCO_3$ 30 g (based on 1 L of distilled water)

After completion of the culture, the production of L-tyrosine was measured using HPLC. The L-tyrosine concentration and concentration increase rate in the culture medium for CM06-0010 and CM06-0010ΔPn::Pm4tkt_tkt strains are shown in Table 8 below.

TABLE 8

| Name of Strain | L-Tyrosine Concentration (g/L) | L-Tyrosine Concentration Increase Rate (%) |
|---|---|---|
| CM06-0010 | 2.01 | — |
| CM06-0010ΔPn::Pm4tkt_tkt | 2.86 | 42.29% |

As shown in Table 8, it was confirmed that the L-tyrosine concentration was increased by 42.29% in the CM06-0010ΔPn::Pm4tkt_tkt strain in which the native promoter of the tkt gene was replaced with the Pm4tkt variant, compared to the CM06-0010 strain, the control.

Example 3-7. Evaluation of Phenylalanine Producing Ability 3-7-1. Construction of L-Phenylalanine-Producing Strain In order to confirm the effect of the Pm4tkt promoter variant, first, an L-phenylalanine-producing strain was prepared based on the wild-type *Corynebacterium glutamicum* ATCC13869 strain (see Korean Patent No. 10-2134418).

Specifically, a tyrA gene that receives feedback regulation by L-tyrosine was replaced with a tyrA variant that does not receive feedback regulation derived from *E. coli* including a strong gapA promoter. It is known that in the *E. coli*-derived tyrA protein, the feedback is released when methionine at position 53 is mutated with isoleucine, and alanine at position 354 is mutated with valine, and this form of protein (SEQ ID NO: 50) was used (Appl. Microbiol. Biotechnol. 75, 103-110 (2007)).

For the genetic manipulation, upstream and downstream regions of the tyrA gene in which the tyrA gene was to be inserted by substitution were first obtained. Specifically, a gene fragment in the upstream region of the tyrA gene was obtained using the primers of SEQ ID NOS: 51 and 52, and a gene fragment in the downstream region of the tyrA gene was obtained using the primers of SEQ ID NOS: 53 and 54 based on the chromosomal DNA of *Corynebacterium glu-* tamicum ATCC13869 as a template through PCR. Additionally, in order to obtain an *E. coli*-derived variant tyrA gene including a gapA promoter, a gapA promoter fragment was obtained using the primers of SEQ ID NOS: 55 and 56 based on the chromosomal DNA of *Corynebacterium glutamicum* ATCC13869 as a template through PCR, and an *E. coli*-derived variant tyrA gene fragment was obtained using the primers of SEQ ID NOS: 57 and 58 based on the *E. coli*-derived variant tyrA synthetic DNA (SEQ ID NO: 50) as a template through PCR. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 60 seconds, and then polymerization at 72° C. for 5 minutes.

The amplified tyrA upstream and downstream regions, gapA promoter, *E. coli*-derived variant tyrA gene fragment and pDCM2 vector for chromosomal transformation cleaved by SmaI restriction enzyme were cloned using the Gibson assembly method to obtain a recombinant plasmid, and the resulting product was named pDCM2-ΔtyrA::PgapA-tyrAm. The cloning was performed by mixing the Gibson assembly reagent and each of the gene fragments in a calculated number of moles, followed by incubating at 50° C. for 1 hour.

The thus-prepared pDCM2-ΔtyrA::PgapA-tyrAm vector was transformed into the wild-type *Corynebacterium glutamicum* ATCC13869 via electroporation and then subjected to secondary crossover to obtain a strain in which the *E. coli*-derived variant tyrA gene including the gapA promoter was inserted, while deleting the tyrA gene at the same time. The corresponding genetic manipulation was confirmed through genomic sequencing and PCR using the primers of SEQ ID NOS: 59 and 60, and the resulting strain was named ATCC13869ΔtyrA::PgapA-tyrAm.

The aroG gene involved in the first step of the common aromatic biosynthetic pathway was enhanced by adding a strong promoter to an *E. coli*-derived feedback regulation release variant aroG. It is known that in the *E. coli*-derived aroG protein, the feedback is released when proline at position 150 is substituted with leucine, and this form of protein (SEQ ID NO: 61) was used (Appl. Environ. Microbiol. 63, 761-762 (1997)).

For the genetic manipulation, upstream and downstream regions into which the aroG gene was to be further inserted were obtained. Specifically, a vector was prepared using the BBD29_14470 position, which is one of the transposases of *Corynebacterium glutamicum* where homologous recombination occurs on the chromosome.

Specifically, a gene fragment in the upstream region of BBD29_14470 gene was obtained using the primers of SEQ ID NOS: 62 and 63, and a gene fragment in the downstream region of BBD29_14470 gene was obtained using the primers of SEQ ID NOS: 64 and 65 based on the chromosomal DNA of *Corynebacterium glutamicum* ATCC13869 as a template through PCR. Additionally, in order to obtain an *E. coli*-derived aroG gene including a gapA promoter, a gapA promoter fragment was obtained using the primers of SEQ ID NOS: 66 and 67 based on the chromosomal DNA of *Corynebacterium glutamicum* ATCC13869 as a template through PCR, and an *E. coli*-derived variant aroG gene fragment was obtained using the primers of SEQ ID NOS: 68 and 69 based on the *E. coli*-derived feedback release variant aroG synthetic DNA (SEQ ID NO: 61) as a template through PCR. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 60 seconds, and then polymerization at 72° C. for 5 minutes.

The amplified upstream and downstream regions of the BBD29_14470 gene, gapA promoter, *E. coli*-derived variant aroG gene fragment and pDCM2 vector for chromosomal transformation cleaved by SmaI restriction enzyme were cloned using the Gibson assembly method to obtain a recombinant plasmid, and the resulting product was named pDCM2-ΔBBD29_14470::PgapA-aroGm. The cloning was performed by mixing the Gibson assembly reagent and each of the gene fragments in a calculated number of moles, followed by incubating at 50° C. for 1 hour.

The thus-prepared pDCM2-ΔBBD29_14470::PgapA-aroGm vector was transformed into the ATCC13869ΔtyrA::PgapA-tyrAm strain via electroporation and then subjected to secondary crossover to obtain a strain into which the *E. coli*-derived feedback release variant aroG gene including the gapA promoter was inserted. The corresponding genetic manipulation was confirmed through genome sequencing and PCR using the primers of SEQ ID NOS: 70 and 71, and the resulting strain was named ATCC13869ΔtyrA::PgapA-tyrAmΔBBD29_14470::PgapA-aroGm.

3-7-2. Construction of L-Phenylalanine-Producing Strain Inserted with One Copy of tkt Gene A L-phenylalanine-producing strain was prepared using the pDCM2-ΔaroP, pDCM2-ΔaroP::Pm4tkt_tkt and pDCM2-ΔaroP::Pntkt_tkt prepared in Example 2-2. The three vectors were introduced into the ATCC13869ΔtyrA::PgapA-tyrAmΔBBD29_14470::PgapA-aroGm strain prepared in Example 3-7-1 via electroporation, and then the transformed strain was obtained in a selection medium containing 25 mg/L kanamycin. Through secondary crossover, strains in which the aroP is deleted, or Pntkt_tkt gene and Pm4tkt_tkt gene are inserted on the aroP position on the chromosome were each obtained. The corresponding genetic manipulation was confirmed through genome sequencing and PCR using SEQ ID NOS: 46 and 47, and the thus-prepared strains were named ATCC13869ΔtyrA::PgapA-tyrAmΔBBD29_14470::PgapA-aroGmΔaroP, ATCC13869ΔtyrA::PgapA-tyrAmΔBBD29_14470::PgapA-aroGmΔaroP::Pntkt_tkt, and ATCC13869ΔtyrA::PgapA-tyrAmΔBBD29_14470::PgapA-aroGmΔaroP::Pm4tkt_tkt, respectively.

3-7-3. Evaluation of L-Phenylalanine-Producing Ability of Strains Inserted with One Copy of tkt Gene In order to evaluate the L-phenylalanine producing ability of the *Corynebacterium glutamicum* ATCC13869ΔtyrA::PgapA-tyrAm ΔBBD29_14470::PgapA-aroGm used as the parent strain, and ATCC13869ΔtyrA::PgapA-tyrAmΔBBD29_14470::PgapA-aroGmΔaroP, ATCC13869ΔtyrA::PgapA-tyrAm ΔBBD29_14470::PgapA-aroGmΔaroP::Pntkt_tkt and ATCC13869ΔtyrA::PgapA-tyrAm ΔBBD29_14470::PgapA-aroGmΔaroP::Pm4tkt_tkt strains prepared in Example 3-7-2, the strains were cultured in the following manner and then analyzed.

First, each strain was seeded into a 250 mL corner-baffle flask containing 25 mL of a seed medium and cultured at 30° C. for 20 hours at 200 rpm with shaking. Then, 1 mL of the seed culture solution was seeded into a 250 mL corner-baffle flask containing 24 mL of a production medium and cultured at 32° C. for 48 hours at 200 rpm with shaking. Compositions of the nutrient medium, seed medium, and production medium are shown below.

<Seed Medium (pH 7.0)>

Glucose 20 g, Peptone 10 g, Yeast Extract 5 g, Urea 1.5 g, $KH_2PO_4$ 4 g, $K_2HPO_4$ 8 g, $MgSO_4·7H_2O$ 0.5 g, Biotin 100 µg, Thiamine-HCl 1000 µg, Calcium Pantothenate 2000 µg, Nicotinamide 2000 µg (based on 1 L of distilled water)

<Production Medium (pH 7.0)>

Glucose 30 g, $(NH_4)_2SO_4$ 15 g, $MgSO_4$ $7H_2O$ 1.2 g, $KH_2PO_4$ 1 g, Yeast Extract 5 g, Biotin 900 µg, Thiamine-HCl 4500 µg, Calcium Pantothenate 4500 µg, $CaCO_3$ 30 g (based on 1 L of distilled water).

After completion of the culture, the production of L-phenylalanine was measured using HPLC. The L-phenylalanine concentration and concentration increase rate in the culture medium for *Corynebacterium glutamicum* ATCC13869ΔtyrA::PgapA-tyrAmΔBBD29_14470::PgapA-aroGm, ATCC13869ΔtyrA::PgapA-tyrAmΔBBD29_14470::PgapA-aroGmΔaroP, ATCC13869ΔtyrA::PgapA-tyrAmΔBBD29_14470::PgapA-aroGmΔaroP::Pntkt_tkt, and ATCC13869ΔtyrA::PgapA-tyrAmΔBBD29_14470::PgapA-aroGmΔaroP::Pm4tkt_tkt strains are shown in Table 9 below.

TABLE 9

| Name of Strains | L-Phenylalanine Concentration (g/L) | L-Phenylalanine Concentration Increase Rate (%) |
| --- | --- | --- |
| ATCC13869ΔtyrA::PgapA-tyrAmΔBBD29_14470::PgapA-aroGm | 1.04 | — |
| ATCC13869ΔtyrA::PgapA-tyrAmΔBBD29_14470::PgapA-aroGmΔaroP | 1.05 | — |
| ATCC13869ΔtyrA::PgapA-tyrAmΔBBD29_14470::PgapA-aroGmΔaroP::Pntkt_tkt | 1.28 | 21.90% |

TABLE 9-continued

| Name of Strains | L-Phenylalanine Concentration (g/L) | L-Phenylalanine Concentration Increase Rate (%) |
| --- | --- | --- |
| ATCC13869ΔtyrA::PgapA-tyrAmΔBBD29_14470::PgapA-aroGmΔaroP::Pm4tkt_tkt | 1.46 | 39.05% |

As shown in Table 9, it was confirmed that the L-phenylalanine concentration was increased by 39.05% in the ATCC13869ΔtyrA::PgapA-tyrAmΔBBD29_14470::PgapA-aroGmΔaroP::Pm4tkt_tkt strain in which one copy of the Pm4tkt_tkt gene was introduced, as compared to the ATCC13869ΔtyrA::PgapA-tyrAmΔBBD29_14470::PgapA-aroGmΔaroP strain, the control.

Through the above results, the recombinant microorganism including the polynucleotide having the promoter activity of the present application increased the productivity of L-lysine, L-threonine, 0-acetyl homoserine, L-isoleucine, and aromatic amino acids such as L-tryptophan, L-tyrosine, and L-phenylalanine, which are industrially useful.

From the foregoing, a skilled person in the art to which the present application pertains will be able to understand that the present application may be embodied in other specific forms without modifying the technical concepts or essential characteristics of the present application. In this regard, the exemplary embodiments disclosed herein are only for illustrative purposes and should not be construed as limiting the scope of the present application. The scope of the present application is therefore indicated by the appended claims rather than by the foregoing description. All changes which come within the meaning and range of equivalency of the claims are to be embraced within the scope of the present application.

[Deposition No.]

Depository Institution: Korean Culture Center of Microorganisms (International Depositary Authority)

Accession No.: KCCM12971P

Deposition Date: 20210405

---

The invention claimed is:

1. A polynucleotide having promoter activity, in which the nucleotides at positions 218, 219, 220, 221, 222, 225, and 227 in the polynucleotide sequence of SEQ ID NO: 1 are substituted with other nucleotides.

2. The polynucleotide of claim 1, wherein the polynucleotide comprises a substitution of cytosine (C), the nucleotide at position 218, with thymine (T), a substitution of cytosine (C), the nucleotide at position 219, with guanine (G), a substitution of adenine (A), the nucleotide at position 220, with thymine (T), a substitution of adenine (A), the nucleotide at position 221, with guanine (G), a substitution of thymine (T), the nucleotide at position 222, with guanine (G), a substitution of adenine (A), the nucleotide at position 225, with thymine (T), and a substitution of cytosine (C), the nucleotide at position 227, with adenine (A), in the polynucleotide sequence of SEQ ID NO: 1.

3. The polynucleotide of claim 1, wherein the polynucleotide is composed of a nucleotide sequence of SEQ ID NO: 2.

4. The polynucleotide of claim 1, wherein the polynucleotide is operably linked to a gene encoding a target protein.

5. A gene expression cassette, comprising: the polynucleotide claim 1; and a gene encoding a target protein which is operably linked to the polynucleotide.

6. The gene expression cassette of claim 5, wherein the target protein is transketolase.

7. A host cell, comprising: the polynucleotide of claim 1; and a gene encoding a target protein which is operably linked to the polynucleotide.

8. The host cell of claim 7, wherein the target protein is transketolase.

9. The host cell of claim 7, wherein the host cell is a microorganism of the genus *Corynebacterium*.

10. The host cell of claim 9, wherein the microorganism of the genus *Corynebacterium* is *Corynebacterium glutamicum*.

11. A method for producing a target material, comprising: culturing the host cell of claim 7 in a medium; and recovering the target material from the medium.

12. The method of claim 11, wherein the target material is an amino acid.

13. The method of claim 11, wherein the target material is at least one selected from the group consisting of lysine, threonine, O-acetyl homoserine, isoleucine, tryptophan, tyrosine, and phenylalanine.

14. The gene expression cassette of claim 5, wherein the polynucleotide comprises a substitution of cytosine (C), the nucleotide at position 218, with thymine (T), a substitution of cytosine (C), the nucleotide at position 219, with guanine (G), a substitution of adenine (A), the nucleotide at position 220, with thymine (T), a substitution of adenine (A), the nucleotide at position 221, with guanine (G), a substitution of thymine (T), the nucleotide at position 222, with guanine (G), a substitution of adenine (A), the nucleotide at position 225, with thymine (T), and a substitution of cytosine (C), the nucleotide at position 227, with adenine (A), in the polynucleotide sequence of SEQ ID NO: 1.

15. The gene expression cassette of claim 5, wherein the polynucleotide is composed of a nucleotide sequence of SEQ ID NO: 2.

16. The host cell of claim 7, wherein the polynucleotide comprises a substitution of cytosine (C), the nucleotide at position 218, with thymine (T), a substitution of cytosine (C), the nucleotide at position 219, with guanine (G), a substitution of adenine (A), the nucleotide at position 220, with thymine (T), a substitution of adenine (A), the nucleotide at position 221, with guanine (G), a substitution of thymine (T), the nucleotide at position 222, with guanine (G), a substitution of adenine (A), the nucleotide at position 225, with thymine (T), and a substitution of cytosine (C), the nucleotide at position 227, with adenine (A), in the polynucleotide sequence of SEQ ID NO: 1.

17. The host cell of claim 7, wherein the polynucleotide is composed of a nucleotide sequence of SEQ ID NO: 2.

* * * * *

SEQUENCE LISTING

```
<160> NUMBER OF SEQ ID NOS: 71

<210> SEQ ID NO 1
<211> LENGTH: 300
<212> TYPE: DNA
<213> ORGANISM: Unknown
<220> FEATURE:
<223> OTHER INFORMATION: promoter

<400> SEQUENCE: 1
gcttgccgaa cattttctt ttcctttcgg tttttcgaga attttcacct acaaaagccc      60
acgtcacagc tcccagactt aagattgatc acacctttga cacatttgaa ccacagttgg     120
ttataaaatg ggttcaacat cactatggtt agaggtgttg acgggtcaga ttaagcaaag     180
actactttcg gggtagatca cctttgccaa atttgaacca attaacctaa gtcgtagatc     240
tgatcatcgg atctaacgaa aacgaaccaa aactttggtc ccggtttaac ccaggaagga     300

<210> SEQ ID NO 2
<211> LENGTH: 300
<212> TYPE: DNA
<213> ORGANISM: Unknown
<220> FEATURE:
<223> OTHER INFORMATION: promoter variant
```

<400> SEQUENCE: 2

```
gcttgccgaa catttttctt ttcctttcgg tttttcgaga attttcacct acaaaagccc    60
acgtcacagc tcccagactt aagattgatc acacctttga cacatttgaa ccacagttgg   120
ttataaaatg ggttcaacat cactatggtt agaggtgttg acgggtcaga ttaagcaaag   180
actactttcg gggtagatca cctttgccaa atttgaatgt ggtatcataa gtcgtagatc   240
tgatcatcgg atctaacgaa aacgaaccaa aactttggtc ccggtttaac ccaggaagga   300
```

<210> SEQ ID NO 3
<211> LENGTH: 37
<212> TYPE: DNA
<213> ORGANISM: Artificial Sequence
<220> FEATURE:
<223> OTHER INFORMATION: primer

<400> SEQUENCE: 3

```
ctctagaact agtggatccg cttgccgaac attttc                              37
```

<210> SEQ ID NO 4
<211> LENGTH: 37
<212> TYPE: DNA
<213> ORGANISM: Artificial Sequence
<220> FEATURE:
<223> OTHER INFORMATION: primer

<400> SEQUENCE: 4

```
gttcttctcc tttactcatt ccttcctggg ttaaacc                             37
```

<210> SEQ ID NO 5
<211> LENGTH: 37
<212> TYPE: DNA
<213> ORGANISM: Artificial Sequence
<220> FEATURE:
<223> OTHER INFORMATION: primer

<400> SEQUENCE: 5

```
ggtttaaccc aggaaggaat gagtaaagga gaagaac                             37
```

<210> SEQ ID NO 6
<211> LENGTH: 39
<212> TYPE: DNA
<213> ORGANISM: Artificial Sequence
<220> FEATURE:
<223> OTHER INFORMATION: primer

<400> SEQUENCE: 6

```
ccccccctcga ggtcgactta tttgtagagc tcatccatg                          39
```

<210> SEQ ID NO 7
<211> LENGTH: 18
<212> TYPE: DNA
<213> ORGANISM: Artificial Sequence
<220> FEATURE:
<223> OTHER INFORMATION: primer

<400> SEQUENCE: 7

```
gcttgccgaa catttttc                                                  18
```

<210> SEQ ID NO 8
<211> LENGTH: 18
<212> TYPE: DNA
<213> ORGANISM: Artificial Sequence
<220> FEATURE:

<223> OTHER INFORMATION: primer

<400> SEQUENCE: 8
tccttcctgg gttaaacc                                                      18

<210> SEQ ID NO 9
<211> LENGTH: 36
<212> TYPE: DNA
<213> ORGANISM: Artificial Sequence
<220> FEATURE:
<223> OTHER INFORMATION: primer

<400> SEQUENCE: 9
tgaattcgag ctcggtaccc ccgcacccat ccagcc                                  36

<210> SEQ ID NO 10
<211> LENGTH: 36
<212> TYPE: DNA
<213> ORGANISM: Artificial Sequence
<220> FEATURE:
<223> OTHER INFORMATION: primer

<400> SEQUENCE: 10
gaaaaatgtt cggcaagcaa tacggtgcaa cgtcaa                                  36

<210> SEQ ID NO 11
<211> LENGTH: 36
<212> TYPE: DNA
<213> ORGANISM: Artificial Sequence
<220> FEATURE:
<223> OTHER INFORMATION: primer

<400> SEQUENCE: 11
ttgacgttgc accgtattgc ttgccgaaca tttttc                                  36

<210> SEQ ID NO 12
<211> LENGTH: 36
<212> TYPE: DNA
<213> ORGANISM: Artificial Sequence
<220> FEATURE:
<223> OTHER INFORMATION: primer

<400> SEQUENCE: 12
cagcgtcaag gtggtcaatc cttcctgggt taaacc                                  36

<210> SEQ ID NO 13
<211> LENGTH: 36
<212> TYPE: DNA
<213> ORGANISM: Artificial Sequence
<220> FEATURE:
<223> OTHER INFORMATION: primer

<400> SEQUENCE: 13
ggtttaaccc aggaaggatt gaccaccttg acgctg                                  36

<210> SEQ ID NO 14
<211> LENGTH: 38
<212> TYPE: DNA
<213> ORGANISM: Artificial Sequence
<220> FEATURE:
<223> OTHER INFORMATION: primer

<400> SEQUENCE: 14
gtcgactcta gaggatcccc ggtcgcttgg tgtccttc                                38

<210> SEQ ID NO 15
<211> LENGTH: 32
<212> TYPE: DNA
<213> ORGANISM: Artificial Sequence
<220> FEATURE:
<223> OTHER INFORMATION: primer

<400> SEQUENCE: 15
cggtacccgg ggatccctgg accacgatcg cc                                32

<210> SEQ ID NO 16
<211> LENGTH: 40
<212> TYPE: DNA
<213> ORGANISM: Artificial Sequence
<220> FEATURE:
<223> OTHER INFORMATION: primer

<400> SEQUENCE: 16
taatttctat cggcctaagt actgtatcaa ccgtaaaccc                        40

<210> SEQ ID NO 17
<211> LENGTH: 40
<212> TYPE: DNA
<213> ORGANISM: Artificial Sequence
<220> FEATURE:
<223> OTHER INFORMATION: primer

<400> SEQUENCE: 17
gggtttacgg ttgatacagt acttaggccg atagaaatta                        40

<210> SEQ ID NO 18
<211> LENGTH: 32
<212> TYPE: DNA
<213> ORGANISM: Artificial Sequence
<220> FEATURE:
<223> OTHER INFORMATION: primer

<400> SEQUENCE: 18
atgcctgcag gtcgacgagg ccgtttgagc cc                                32

<210> SEQ ID NO 19
<211> LENGTH: 37
<212> TYPE: DNA
<213> ORGANISM: Artificial Sequence
<220> FEATURE:
<223> OTHER INFORMATION: primer

<400> SEQUENCE: 19
ttacggttga tacagtactg cttgccgaac atttttc                           37

<210> SEQ ID NO 20
<211> LENGTH: 36
<212> TYPE: DNA
<213> ORGANISM: Artificial Sequence
<220> FEATURE:
<223> OTHER INFORMATION: primer

<400> SEQUENCE: 20
cagcgtcaag gtggtcaatc cttcctgggt taaacc                            36

<210> SEQ ID NO 21
<211> LENGTH: 36
<212> TYPE: DNA
<213> ORGANISM: Artificial Sequence
<220> FEATURE:
<223> OTHER INFORMATION: primer

<400> SEQUENCE: 21
ggtttaaccc aggaaggatt gaccaccttg acgctg                         36

<210> SEQ ID NO 22
<211> LENGTH: 37
<212> TYPE: DNA
<213> ORGANISM: Artificial Sequence
<220> FEATURE:
<223> OTHER INFORMATION: primer

<400> SEQUENCE: 22
tctatcggcc taagtacttt aaccgttaat ggagtcc                        37

<210> SEQ ID NO 23
<211> LENGTH: 40
<212> TYPE: DNA
<213> ORGANISM: Artificial Sequence
<220> FEATURE:
<223> OTHER INFORMATION: primer

<400> SEQUENCE: 23
tgaattcgag ctcggtaccc ggagctgctg tccaacgtgg                     40

<210> SEQ ID NO 24
<211> LENGTH: 40
<212> TYPE: DNA
<213> ORGANISM: Artificial Sequence
<220> FEATURE:
<223> OTHER INFORMATION: primer

<400> SEQUENCE: 24
gtcgactcta gaggatcccc tgggaacttg tcgacgctat                     40

<210> SEQ ID NO 25
<211> LENGTH: 40
<212> TYPE: DNA
<213> ORGANISM: Artificial Sequence
<220> FEATURE:
<223> OTHER INFORMATION: primer

<400> SEQUENCE: 25
tgaattcgag ctcggtaccc tccaagattt tggtgctgcg                     40

<210> SEQ ID NO 26
<211> LENGTH: 40
<212> TYPE: DNA
<213> ORGANISM: Artificial Sequence
<220> FEATURE:
<223> OTHER INFORMATION: primer

<400> SEQUENCE: 26
atctcagagg tggaaatctt ttcgatgttc acgttgacat                     40

<210> SEQ ID NO 27
<211> LENGTH: 40
<212> TYPE: DNA
<213> ORGANISM: Artificial Sequence
<220> FEATURE:
<223> OTHER INFORMATION: primer

<400> SEQUENCE: 27
atgtcaacgt gaacatcgaa aagatttcca cctctgagat                     40

<210> SEQ ID NO 28
<211> LENGTH: 40

```
<212> TYPE: DNA
<213> ORGANISM: Artificial Sequence
<220> FEATURE:
<223> OTHER INFORMATION: primer

<400> SEQUENCE: 28
gtcgactcta gaggatcccc gttcacctca gagacgatta                              40

<210> SEQ ID NO 29
<211> LENGTH: 20
<212> TYPE: DNA
<213> ORGANISM: Artificial Sequence
<220> FEATURE:
<223> OTHER INFORMATION: primer

<400> SEQUENCE: 29
tcctaatgca cagaagctgg                                                    20

<210> SEQ ID NO 30
<211> LENGTH: 20
<212> TYPE: DNA
<213> ORGANISM: Artificial Sequence
<220> FEATURE:
<223> OTHER INFORMATION: primer

<400> SEQUENCE: 30
gtggtgcagt tagggttcgc                                                    20

<210> SEQ ID NO 31
<211> LENGTH: 40
<212> TYPE: DNA
<213> ORGANISM: Artificial Sequence
<220> FEATURE:
<223> OTHER INFORMATION: primer

<400> SEQUENCE: 31
tgaattcgag ctcggtaccc tttccacacc cgtgttaccg                              40

<210> SEQ ID NO 32
<211> LENGTH: 40
<212> TYPE: DNA
<213> ORGANISM: Artificial Sequence
<220> FEATURE:
<223> OTHER INFORMATION: primer

<400> SEQUENCE: 32
atcatcgcgc tcttcctgtt ggattgtacg cagggagatt                              40

<210> SEQ ID NO 33
<211> LENGTH: 40
<212> TYPE: DNA
<213> ORGANISM: Artificial Sequence
<220> FEATURE:
<223> OTHER INFORMATION: primer

<400> SEQUENCE: 33
aatctccctg cgtacaatcc aacaggaaga gcgcgatgat                              40

<210> SEQ ID NO 34
<211> LENGTH: 40
<212> TYPE: DNA
<213> ORGANISM: Artificial Sequence
<220> FEATURE:
<223> OTHER INFORMATION: primer

<400> SEQUENCE: 34
```
gtcgactcta gaggatcccc aaccattagc tgcagcaaca         40

<210> SEQ ID NO 35
<211> LENGTH: 20
<212> TYPE: DNA
<213> ORGANISM: Artificial Sequence
<220> FEATURE:
<223> OTHER INFORMATION: primer

<400> SEQUENCE: 35
atccaactgc agacgtcgaa         20

<210> SEQ ID NO 36
<211> LENGTH: 20
<212> TYPE: DNA
<213> ORGANISM: Artificial Sequence
<220> FEATURE:
<223> OTHER INFORMATION: primer

<400> SEQUENCE: 36
atctgggtgg ccttcaaagg         20

<210> SEQ ID NO 37
<211> LENGTH: 36
<212> TYPE: DNA
<213> ORGANISM: Artificial Sequence
<220> FEATURE:
<223> OTHER INFORMATION: primer

<400> SEQUENCE: 37
tgaattcgag ctcggtaccc ggcgttcttg cagtcc         36

<210> SEQ ID NO 38
<211> LENGTH: 36
<212> TYPE: DNA
<213> ORGANISM: Artificial Sequence
<220> FEATURE:
<223> OTHER INFORMATION: primer

<400> SEQUENCE: 38
ttgttgacat gaagcgccgg ggcacctacc gaggaa         36

<210> SEQ ID NO 39
<211> LENGTH: 36
<212> TYPE: DNA
<213> ORGANISM: Artificial Sequence
<220> FEATURE:
<223> OTHER INFORMATION: primer

<400> SEQUENCE: 39
ttcctcggta ggtgccccgg cgcttcatgt caacaa         36

<210> SEQ ID NO 40
<211> LENGTH: 36
<212> TYPE: DNA
<213> ORGANISM: Artificial Sequence
<220> FEATURE:
<223> OTHER INFORMATION: primer

<400> SEQUENCE: 40
gcgcaccgaa ctcttcaaca ccgcgaggga agaaat         36

<210> SEQ ID NO 41
<211> LENGTH: 36
<212> TYPE: DNA
<213> ORGANISM: Artificial Sequence

```
<220> FEATURE:
<223> OTHER INFORMATION: primer

<400> SEQUENCE: 41
atttcttccc tcgcggtgtt gaagagttcg gtgcgc                           36

<210> SEQ ID NO 42
<211> LENGTH: 37
<212> TYPE: DNA
<213> ORGANISM: Artificial Sequence
<220> FEATURE:
<223> OTHER INFORMATION: primer

<400> SEQUENCE: 42
gtcgactcta gaggatcccc gggtacagct gcagctc                          37

<210> SEQ ID NO 43
<211> LENGTH: 450
<212> TYPE: DNA
<213> ORGANISM: Artificial Sequence
<220> FEATURE:
<223> OTHER INFORMATION: trpE(S38R) promoter seq.

<400> SEQUENCE: 43
ggcgcttcat gtcaacaatc tttaacgttt tcaagttcac aagtcgtgtt caaatggtga     60
caagattgga cactgtgctg aattggcacc aagccctcat aaatgataga tctaaatcga    120
atatcaatat atggtctgtt tattggaacg cgtcccagtg gctgagacgc atccgctaaa    180
gccccaggaa ccctgtgcag aaagaacaaa taatcgtgaa ttttggcagc aacagcaatt    240
cctgctacaa ttgaaaacgt gcaaaagcat agattattgg aggagatcaa acaatgagc     300 acgaatcccc atgttttctc cctagatgtc cgctatcacg aggatgcttc tgcgttgttt    360
gcccacttgg gtggcacaac cgcagatgat gcagccctgt tggaacgcgc tgatatcacc    420
accaagaatg gtatttcttc cctcgcggtg                                    450

<210> SEQ ID NO 44
<211> LENGTH: 16
<212> TYPE: DNA
<213> ORGANISM: Artificial Sequence
<220> FEATURE:
<223> OTHER INFORMATION: primer

<400> SEQUENCE: 44
ggcagagcat catacc                                                 16

<210> SEQ ID NO 45
<211> LENGTH: 18
<212> TYPE: DNA
<213> ORGANISM: Artificial Sequence
<220> FEATURE:
<223> OTHER INFORMATION: primer

<400> SEQUENCE: 45
ggcatcagtg cgcatatc                                               18

<210> SEQ ID NO 46
<211> LENGTH: 16
<212> TYPE: DNA
<213> ORGANISM: Artificial Sequence
<220> FEATURE:
<223> OTHER INFORMATION: primer

<400> SEQUENCE: 46
```

```
ctggaccacg atcgcc                                                   16
```

<210> SEQ ID NO 47
<211> LENGTH: 16
<212> TYPE: DNA
<213> ORGANISM: Artificial Sequence
<220> FEATURE:
<223> OTHER INFORMATION: primer

<400> SEQUENCE: 47

```
gaggccgttt gagccc                                                   16
```

<210> SEQ ID NO 48
<211> LENGTH: 20
<212> TYPE: DNA
<213> ORGANISM: Artificial Sequence
<220> FEATURE:
<223> OTHER INFORMATION: primer

<400> SEQUENCE: 48

```
ggagctgctg tccaacgtgg                                               20
```

<210> SEQ ID NO 49
<211> LENGTH: 20
<212> TYPE: DNA
<213> ORGANISM: Artificial Sequence
<220> FEATURE:
<223> OTHER INFORMATION: primer

<400> SEQUENCE: 49

```
tgggaacttg tcgacgctat                                               20
```

<210> SEQ ID NO 50
<211> LENGTH: 1122
<212> TYPE: DNA
<213> ORGANISM: Unknown
<220> FEATURE:
<223> OTHER INFORMATION: tyrA gene

<400> SEQUENCE: 50

```
atggttgctg aattgaccgc attacgcgat caaattgatg aagtcgataa agcgctgctg    60
aatttattag cgaagcgtct ggaactggtt gctgaagtgg gcgaggtgaa aagccgcttt   120
ggactgccta tttatgttcc ggagcgcgag gcatctattt tggcctcgcg tcgtgcagag   180
gcggaagctc tgggtgtacc gccagatctg attgaggatg ttttgcgtcg ggtgatgcgt   240
gaatcttact ccagtgaaaa cgacaaagga tttaaaacac tttgtccgtc actgcgtccg   300
gtggttatcg tcggcggtgg cggtcagatg ggacgcctgt tcgagaagat gctgaccctc   360
tcgggttatc aggtgcggat tctggagcaa catgactggg atcgagcggc tgatattgtt   420
gccgatgccg gaatggtgat tgttagtgtg ccaatccacg ttactgagca agttattggc   480
aaattaccgc ctttaccgaa agattgtatt ctggtcgatc tggcatcagt gaaaaatggg   540
ccattacagg ccatgctggt ggcgcatgat ggtccggtgc tggggctaca cccgatgttc   600
ggtccggaca gcggtagcct ggcaaagcaa gttgtggtct ggtgtgatgg acgtaaaccg   660
gaagcatacc aatggtttct ggagcaaatt caggtctggg gcgctcggct gcatcgtatt   720
agcgccgtcg agcacgatca gaatatggcg tttattcagg cactgcgcca ctttgctact   780
tttgcttacg ggctgcacct ggcagaagaa aatgttcagc ttgagcaact tctggcgctc   840
tcttcgccga tttaccgcct tgagctgcg atggtcgggc gactgtttgc tcaggatccg   900
cagctttatg ccgacatcat tatgtcgtca gagcgtaatc tggcgttaat caaacgttac   960
```

```
tataagcgtt tcggcgaggc gattgagttg ctggagcagg gcgataagca ggcgtttatt    1020
gacagtttcc gcaaggtgga gcactggttc ggcgattacg tgcagcgttt tcagagtgaa    1080
agccgcgtgt tattgcgtca ggcgaatgac aatcgccagt aa                       1122
```

<210> SEQ ID NO 51
<211> LENGTH: 36
<212> TYPE: DNA
<213> ORGANISM: Artificial Sequence
<220> FEATURE:
<223> OTHER INFORMATION: primer

<400> SEQUENCE: 51

```
ttcgagctcg gtaccctatc aaaaccgagt tcttcc                                  36
```

<210> SEQ ID NO 52
<211> LENGTH: 36
<212> TYPE: DNA
<213> ORGANISM: Artificial Sequence
<220> FEATURE:
<223> OTHER INFORMATION: primer

<400> SEQUENCE: 52

```
gtcgttttta ggcctcctga caagtgtggc acatac                                  36
```

<210> SEQ ID NO 53
<211> LENGTH: 36
<212> TYPE: DNA
<213> ORGANISM: Artificial Sequence
<220> FEATURE:
<223> OTHER INFORMATION: primer

<400> SEQUENCE: 53

```
tgacaatcgc cagtaatttt atcggctgat gattct                                  36
```

<210> SEQ ID NO 54
<211> LENGTH: 36
<212> TYPE: DNA
<213> ORGANISM: Artificial Sequence
<220> FEATURE:
<223> OTHER INFORMATION: primer

<400> SEQUENCE: 54

```
actctagagg atccccaacg cgattgcatt cggctc                                  36
```

<210> SEQ ID NO 55
<211> LENGTH: 36
<212> TYPE: DNA
<213> ORGANISM: Artificial Sequence
<220> FEATURE:
<223> OTHER INFORMATION: primer

<400> SEQUENCE: 55

```
gtgccacact tgtcaggagg cctaaaaacg accgag                                  36
```

<210> SEQ ID NO 56
<211> LENGTH: 36
<212> TYPE: DNA
<213> ORGANISM: Artificial Sequence
<220> FEATURE:
<223> OTHER INFORMATION: primer

<400> SEQUENCE: 56

```
tcaattcagc aaccatgttg tgtctcctct aaagat                                  36
```

<210> SEQ ID NO 57
<211> LENGTH: 36
<212> TYPE: DNA
<213> ORGANISM: Artificial Sequence
<220> FEATURE:
<223> OTHER INFORMATION: primer

<400> SEQUENCE: 57
ttagaggaga cacaacatgg ttgctgaatt gaccgc                          36

<210> SEQ ID NO 58
<211> LENGTH: 36
<212> TYPE: DNA
<213> ORGANISM: Artificial Sequence
<220> FEATURE:
<223> OTHER INFORMATION: primer

<400> SEQUENCE: 58
tcatcagccg ataaaattac tggcgattgt cattcg                          36

<210> SEQ ID NO 59
<211> LENGTH: 16
<212> TYPE: DNA
<213> ORGANISM: Artificial Sequence
<220> FEATURE:
<223> OTHER INFORMATION: primer

<400> SEQUENCE: 59
cgcagcgagc gaaccg                                                16

<210> SEQ ID NO 60
<211> LENGTH: 18
<212> TYPE: DNA
<213> ORGANISM: Artificial Sequence
<220> FEATURE:
<223> OTHER INFORMATION: primer

<400> SEQUENCE: 60
gttcgaatcc ctccgggc                                              18

<210> SEQ ID NO 61
<211> LENGTH: 1053
<212> TYPE: DNA
<213> ORGANISM: Unknown
<220> FEATURE:
<223> OTHER INFORMATION: aroG gene

<400> SEQUENCE: 61
atgaattatc agaacgacga tttacgcatc aaagaaatca agagttact tcctcctgtc    60 gcattgctgg aaaaattccc cgctactgaa aatgccgcga atacggttgc ccatgcccga   120
aaagcgatcc ataagatcct gaaaggtaat gatgatcgcc tgttggttgt gattggccca   180
tgctcaattc atgatcctgt cgcggcaaaa gagtatgcca ctcgcttgct ggcgctgcgt   240
gaagagctga aagatgagct ggaaatcgta atgcgcgtct attttgaaaa gccgcgtacc   300
acggtgggct ggaaagggct gattaacgat ccgcatatgg ataatagctt ccagatcaac   360
gacggtctgc gtatagcccg taaattgctg cttgatatta cgacagcggg tctgccagcg   420
gcaggtgagt ttctcgatat gatcacccca caatatctcg ctgacctgat gagctgggc    480 gcaattggcg cacgtaccac cgaatcgcag gtgcaccgcg aactggcatc agggctttct   540
tgtccggtcg gcttcaaaaa tggcaccgac ggtacgatta agtggcgtat cgatgccatt   600
aatgccgccg gtgcgccgca ctgcttcctg tccgtaacga aatgggggca ttcggcgatt   660

```
gtgaataccga gcggtaacgg cgattgccat atcattctgc gcggcggtaa agagcctaac    720
tacagcgcga agcacgttgc tgaagtgaaa gaagggctga acaaagcagg cctgccagca    780
caggtgatga tcgatttcag ccatgctaac tcgtccaaac aattcaaaaa gcagatggat    840
gtttgtgctg acgtttgcca gcagattgcc ggtggcgaaa aggccattat tggcgtgatg    900
gtggaaagcc atctggtgga aggcaatcag agcctcgaga gcggggagcc gctggcctac    960
ggtaagagca tcaccgatgc ctgcatcggc tgggaagata ccgatgctct gttacgtcaa   1020
ctggcgaatg cagtaaaagc gcgtcgcggg taa                                 1053
```

<210> SEQ ID NO 62
<211> LENGTH: 36
<212> TYPE: DNA
<213> ORGANISM: Artificial Sequence
<220> FEATURE:
<223> OTHER INFORMATION: primer

<400> SEQUENCE: 62

```
ttcgagctcg gtaccccccg gcggtatcga ggtagt                                36
```

<210> SEQ ID NO 63
<211> LENGTH: 40
<212> TYPE: DNA
<213> ORGANISM: Artificial Sequence
<220> FEATURE:
<223> OTHER INFORMATION: primer

<400> SEQUENCE: 63

```
ctcggtcgtt tttaggcctc ttaatcaccc gcggggaccc                            40
```

<210> SEQ ID NO 64
<211> LENGTH: 40
<212> TYPE: DNA
<213> ORGANISM: Artificial Sequence
<220> FEATURE:
<223> OTHER INFORMATION: primer

<400> SEQUENCE: 64

```
taaaagcgcg tcgcgggtaa aaacttgtcc cgagggtgag                            40
```

<210> SEQ ID NO 65
<211> LENGTH: 36
<212> TYPE: DNA
<213> ORGANISM: Artificial Sequence
<220> FEATURE:
<223> OTHER INFORMATION: primer

<400> SEQUENCE: 65

```
actctagagg atcccctatc agtcacttcc ctgaga                                36
```

<210> SEQ ID NO 66
<211> LENGTH: 40
<212> TYPE: DNA
<213> ORGANISM: Artificial Sequence
<220> FEATURE:
<223> OTHER INFORMATION: primer

<400> SEQUENCE: 66

```
gggtccccgc gggtgattaa gaggcctaaa aacgaccgag                            40
```

<210> SEQ ID NO 67
<211> LENGTH: 35
<212> TYPE: DNA

```
<213> ORGANISM: Artificial Sequence
<220> FEATURE:
<223> OTHER INFORMATION: primer

<400> SEQUENCE: 67
gttctgataa ttcatgttgt gtctcctcta aagat                           35

<210> SEQ ID NO 68
<211> LENGTH: 38
<212> TYPE: DNA
<213> ORGANISM: Artificial Sequence
<220> FEATURE:
<223> OTHER INFORMATION: primer

<400> SEQUENCE: 68
ctttagagga gacacaacat gaattatcag aacgacga                        38

<210> SEQ ID NO 69
<211> LENGTH: 40
<212> TYPE: DNA
<213> ORGANISM: Artificial Sequence
<220> FEATURE:
<223> OTHER INFORMATION: primer

<400> SEQUENCE: 69
ctcaccctcg ggacaagttt ttacccgcga cgcgctttta                      40

<210> SEQ ID NO 70
<211> LENGTH: 16
<212> TYPE: DNA
<213> ORGANISM: Artificial Sequence
<220> FEATURE:
<223> OTHER INFORMATION: primer

<400> SEQUENCE: 70
ggtaccggca ggtacc                                                16

<210> SEQ ID NO 71
<211> LENGTH: 16
<212> TYPE: DNA
<213> ORGANISM: Artificial Sequence
<220> FEATURE:
<223> OTHER INFORMATION: primer

<400> SEQUENCE: 71 caaggggtc caatcc                                                 16
```